(12) United States Patent
Nista et al.

(10) Patent No.: US 11,812,887 B2
(45) Date of Patent: Nov. 14, 2023

(54) GROUND COFFEE DISTRIBUTION METHOD, APPARATUS, AND SYSTEM

(71) Applicant: Hyaqu, Inc., Spokane, WA (US)

(72) Inventors: Edward T. Nista, Kingston, WA (US);
Colin Jacob Miller, Seattle, WA (US);
Justin Matthew Knowles, Seattle, WA (US)

(73) Assignee: HYAQU, INC., Spokane, WA (US)

( * ) Notice: Subject to any disclaimer, the term of this patent is extended or adjusted under 35 U.S.C. 154(b) by 0 days.

(21) Appl. No.: 17/827,509

(22) Filed: May 27, 2022

(65) Prior Publication Data

US 2022/0378244 A1     Dec. 1, 2022

Related U.S. Application Data

(60) Provisional application No. 63/195,596, filed on Jun. 1, 2021.

(51) Int. Cl.
| | |
|---|---|
| *A47J 31/06* | (2006.01) |
| *B06B 1/16* | (2006.01) |
| *A47J 31/52* | (2006.01) |

(52) U.S. Cl.
CPC ......... *A47J 31/0663* (2013.01); *A47J 31/525* (2018.08); *B06B 1/16* (2013.01)

(58) Field of Classification Search
CPC .... A47J 31/0663; A47J 31/0657; A47J 31/44; A47J 31/00; A47J 31/3671
USPC .................................................... 99/287, 279
See application file for complete search history.

(56) References Cited

U.S. PATENT DOCUMENTS

| | | |
|---|---|---|
| 2011/0014340 A1 | 1/2011 | Spitzley et al. |
| 2011/0209623 A1* | 9/2011 | Leung ............ A47J 31/44 99/287 |
| 2017/0280925 A1 | 10/2017 | Southern |
| 2018/0153330 A1 | 6/2018 | Abbiati |
| 2018/0161823 A1 | 6/2018 | Patton et al. |

FOREIGN PATENT DOCUMENTS

| | | |
|---|---|---|
| DE | 202018002651 U1 * | 8/2018 |
| KR | 101457189 B1 * | 10/2014 |
| WO | WO-2020257869 A1 * | 12/2020 ...... A47J 31/42 |

OTHER PUBLICATIONS

International Search Report dated Sep. 2, 2022, for PCT/US22/31636, filed May 31, 2022.
Written Opinion dated Sep. 2, 2022, for PCT/US22/31636, filed May 31, 2022.

* cited by examiner

*Primary Examiner* — Tu B Hoang
*Assistant Examiner* — Alba T Rosario-Aponte
(74) *Attorney, Agent, or Firm* — AEON Law, PLLC; Adam L. K. Philipp; James Namiki

(57) ABSTRACT

Methods, apparatus, and system to distribute or compact coffee grounds, such as to form a puck in a portafilter. The methods, apparatus, and system may be used to compact coffee grounds wherein a resulting puck of coffee grounds in the portafilter has an even level, a uniform and or continuous density distribution, results in no or reduced formation of channels, no or reduced squirting of extracted coffee, and results in consistent and repeatable results. The methods, apparatus, and system may be used to form multiple layers in a puck, for use in preparing layered espresso.

11 Claims, 15 Drawing Sheets

GROUND COFFEE DISTRIBUTION METHOD, APPARATUS, AND SYSTEM

FIELD

The present disclosure relates to a method, apparatus, and system to compact ground coffee prior to brewing.

BACKGROUND

Espresso is a coffee brewing method of Italian origin. When making espresso, a barista or other person who prepares espresso (hereinafter, "barista"), forces hot water, under pressure, through finely ground compacted coffee ("coffee grounds"). When coffee beans are ground to produce coffee grounds, there is commonly a range of size of the coffee grounds, e,g. some of the coffee grounds may be pulverized, or "finely ground", and resemble a dust, wherein individual of the coffee grounds are not visible to the unaided eye, whereas other of the coffee grounds may be relatively course, "course grind", and visible to the unaided eye.

When espresso is prepared, coffee grounds are often put into and held in a portafilter or "group handle" (herein, "portafilter" and "group handle" are synonymous). The portafilter may be a basket, open at its top, sized to hold coffee grounds for one or two or more servings or "shots" of espresso, and which has a perforated bottom. The perforated bottom acts as a filter, to prevent the larger coffee grounds from passing through into a shot. The portafilter may comprise no spouts (e.g. a "bottomless portafilter"), one spout, two spouts, or the like, which collect and channel espresso into the spouts. After the coffee grounds are put in the portafilter, the coffee grounds may be tamped into a "puck" within the portafilter. Ideally, after being tamped, the puck of coffee grounds has uniform density and uniform depth in the portafilter.

The portafilter containing tamped coffee grounds in a puck may be inserted, screwed, clamped, or otherwise coupled with a grouphead (or "group head") of an espresso machine, often with a gasket interface between the portafilter and the grouphead. The espresso machine then forces hot water, under pressure, through the portafilter and the puck of coffee grounds. The hot water may be pressurized by, for example, a manual pump, a pressure-based pump, an electronic pump, gravity, or the like, If the coffee grounds do not have uniform density and uniform depth in the portafilter, or if there is a non-uniform distribution of finely ground and coarsely ground coffee beans, then the pressurized water may not flow uniformly through the puck, but may form channels through the puck, through which the water passes with less resistance. A puck which forms channels will not result in maximum extraction of dissolved and suspended solids or other compounds from the coffee grounds, because some of the ground coffee contacts less or even no hot water, compared to ground coffee along the channels, which contact more hot water. When hot water travels in channels through the puck, coffee grounds along the channel may be over-extracted, contributing bitter and other undesirable flavors to the espresso. A puck with non-uniform density and or non-uniform depth, or which otherwise forms channels, may result in "squirting" of espresso through the puck and out of the perforated bottom. As a result, baristas place significant focus on tamping, so as to avoid a tamp which is not level, which leaves clumps, or which otherwise results in channeling of pressurized water through the puck.

Portafilters with spouts are not necessary; a barista may prefer bottomless portafilters, e.g. portafilters with no spouts, so that the barista can see whether channels have formed in the puck.

Espresso is understood to comprise components in three states. A first state comprises an emulsion of oil droplets in water. A second state comprises dissolved and suspended solids in water. A third state comprises gas bubbles or foam and water. "Crema" found on a top of an espresso shot may comprise the emulsion of oil droplets from the first state, which may be relatively low density and float on water, and the gas bubbles or foam from the third state. Small oil droplets may be experienced in a human mouth as "creamy".

When well prepared, espresso is understood to have a higher concentration of dissolved and suspended compounds, to have more intense flavors, and to have a viscosity similar to warm honey when compared to coffee prepared through other techniques (e.g. compared to "drip coffee"). If espresso is not well prepared, such as due to the formation of channels through the portafilter, it may be watery, bitter, and its foam, if any, may lack oil droplets which produce the creamy mouth feel of crema.

Layered espresso may comprise layers of different coffee grounds which are put into the portafilter. The layers may differ in roast, in beans, in grind, or in other characteristics. Each layer may be tamped, before subsequent layers are added. The layers may be chosen to contribute different flavors and compounds to a flavor profile of an espresso shot, such as an acidic flavor, a sweet flavor, a bitter flavor, a caffeine content, and the like.

Notwithstanding great care which may be put into preparation of a puck of coffee grounds in a portafilter, including a flat and uniform tamp, channeling or other undesirable processes may still occur. As noted herein, channeling or other undesirable processes may result in an espresso shot which is watery, bitter, which lacks crema, has foam which does not feel creamy, or which is otherwise undesirable, Needed is a method, apparatus, and system to compact a puck of ground coffee, such that the puck produces an espresso shot with minimal or no channeling and with desirable flavor and physical characteristics. The method, apparatus, and system should produce consistent and repeatable results. The method, apparatus, and system should be useable when preparing layered espresso.

DETAILED DESCRIPTION

Figure 1:
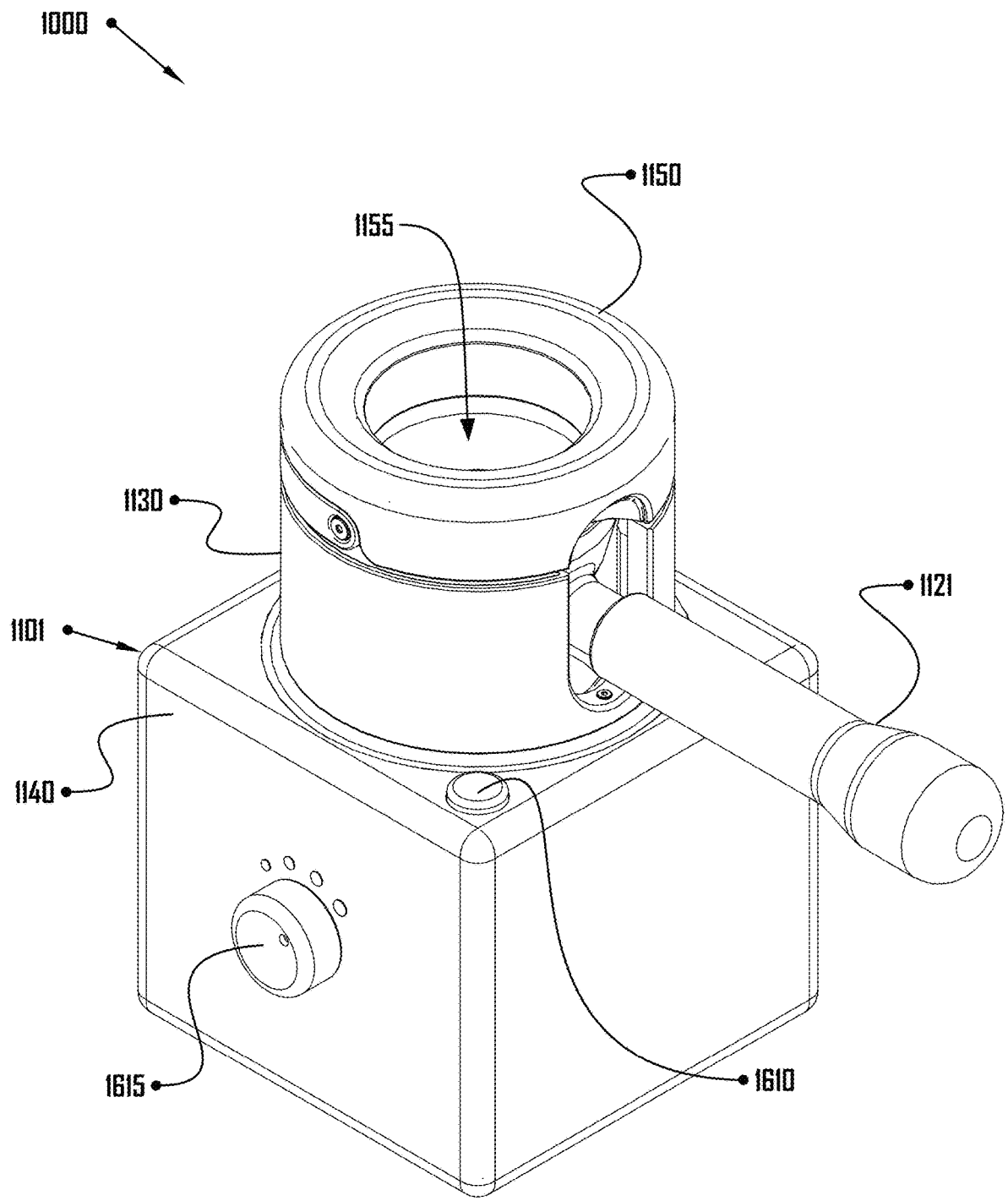
FIG. 1 is a parallel projection oblique view of a first example of a ground coffee compactor and portafilter, incorporated with teachings of the present disclosure, according to some embodiments.

In addition to other locations, defined terms may be found at the end of this Detailed Description.

In overview, this disclosure relates to an apparatus, system, and methods for a compactor of coffee grounds, hereinafter, "coffee grounds compactor". In overview, the disclosed coffee grounds compactor comprises a vibration generator and a portafilter receiver. The vibration generator is to produce a vibratory force in the portafilter receiver. The portafilter receiver is to transmit the vibratory force into a portafilter, such as when the portafilter contains coffee grounds. The portafilter receiver may secure the portafilter within, on, or in contact with the portafilter receiver.

The vibratory force is to at least one of compact the coffee grounds in the portafilter, distribute the coffee grounds in the portafilter, arrange the coffee grounds in the portafilter, compress the coffee grounds in the portafilter, sort the coffee grounds by physical size in the portafilter, sort the coffee grounds by relative density in the portafilter, and or remove air from between the coffee grounds in the portafilter; the foregoing are collectively referred to herein as to "compact" the coffee grounds in the portafilter.

The portafilter receiver may comprise, for example, a surface on which a portafilter may be placed or secured, wherein the surface transmits the vibratory force into the portafilter. The portafilter receiver may comprise, for example, a semi-enclosed structure in which a portafilter may be held or secured. The portafilter receiver may comprise a portafilter shim, wherein the portafilter shim is sized to secure portafilters with a range of sizes within the portafilter receiver. The portafilter receiver may comprise a lid; the lid may secure the portafilter within the portafilter receiver. The portafilter receiver and lid may be secured by, for example, one or more of a magnet, a hinge, a threaded connection, a spring clip, a buckle, a strap, and the like. When the portafilter receiver and lid are secured by a hinge, the hinge may comprise a plurality of pivot points, such as a double action hinge, a scissor action hinge, and the like. The plurality of pivot points may allow the lid to maintain a parallel orientation relative to a top of the portafilter receiver as the lid rises above the top of the portafilter receiver. The hinge may comprise a dosing-lever arm, wherein the portafilter is to contact the closing-lever arm and is to cause the lid to dose on the portafilter receiver.

The lid may comprise a tamper opening, wherein the tamper opening may be sized to receive a tamper and allow coffee grounds in the portafilter to be tamped by the tamper as the coffee ground compactor transmits the vibratory force into the portafilter receiver and portafilter.

The vibratory force may comprise an oscillatory motion, e.g. one or more of a back-and-forth motion, side-to-side motion, up-and-down motion, orbital motion, a motion about an axis of rotation, or a motion with a waveform.

Coffee grounds may be compacted or distributed in different manners by different vibratory forces or oscillatory motions; e.g. an up-and-down oscillatory motion, a frequency of oscillatory motion, or an amplitude (or intensity) of oscillatory motion may cause fine coffee grounds to settle to a bottom of a portafilter, which may not be desirable. A user may wish to control the oscillatory motion, to achieve a result which works for the user.

The vibration generator may comprise, for example, one or more rotary motor or linear actuator. When the vibration generator comprises a linear actuator, the linear actuator may comprise, for example, a solenoid, a mechanical actuator, a hydraulic actuator, a pneumatic actuator, a piezoelectric actuator, an electro-mechanical actuator, a linear electric motor, and an electro-mechanical linear actuator, or the like, The linear actuator may produce the vibratory force at a drive angle relative to the portafilter receiver ("drive angle"); e.g. up-down, side-to-side, forward-and-back, and the like relative to the portafilter receiver. The linear actuator may be located, for example, below, above, or on a side of the portafilter receiver. The linear actuator may be directly secured to the portafilter receiver, such that the linear actuator directly produces oscillatory motion of the portafilter receiver. The linear actuator may be secured to the portafilter receiver and to an inertial mass, wherein oscillatory motion of the inertial mass by the linear actuator produces the vibratory force in the linear actuator and in the portafilter receiver. An array of linear actuators and or inertial masses may be arranged around or relative to portafilter receiver. Each linear actuator in the array of linear actuators may have a drive angle that is offset relative to the drive angle of other of the linear actuators in the array, e.g. if there are four linear actuators in the array, the drive angle of the four linear actuators may be offset from one another by 90 degrees. An electrical drive circuit may control activation of the array of linear actuators in a time phase relationship, such that the oscillatory motion has both a translational components (e.g. back-and-forth and side-to-side), as well as a rotary or orbital component. An oscillatory motion with multiple components may be described as a waveform.

When the vibration generator comprises a rotary motor, a driveshaft of the rotary motor may be coupled to an eccentric driveshaft bearing, wherein the eccentric driveshaft bearing may be coupled to the portafilter receiver; the eccentric driveshaft bearing may be coupled to the portafilter receiver via a spring. In this manner, the rotary motor may cause the portafilter receiver to orbit about the driveshaft of the rotary motor. The driveshaft may further or alternatively be coupled to an eccentric mass, wherein rotation of the eccentric mass may produce or contribute to the vibratory force.

The disclosed coffee grounds compactor may further comprise a housing. The portafilter receiver may be secured to or in the housing; the portafilter receiver may be secured to or in the housing suspended on a spring. The spring may isolate the housing from the vibratory force transmitted into the portafilter receiver. Without the spring, the housing may have a tendency to move on a surface, due to the vibratory force. A flexible gasket may span between the housing and the portafilter receiver, to reduce a tendency of material, such as coffee grounds, to fall into the housing.

The housing may enclose electronics, such as an electrical circuit. The electrical circuit may control the vibration generator and may thereby control at least one of an amplitude of the vibratory force, a frequency of the vibratory force, or a waveform of the vibratory force. The electrical circuit may comprise a user interface, to allow a user to control the foregoing. The electrical circuit may further comprise a pressure sensor, a lid sensor, a lid-activated switch, or the like, to activate the vibration generator when pressure is sensed, such as when a portafilter is inserted into the portafilter receiver, when the lid is closed on the portafilter, or the like.

In this manner, the disclosed coffee grounds compactor may distribute and tamp coffee grounds into a puck; the resulting puck may have a density or distribution of coffee grounds which results in uniform flow of water through the puck, with minimal or no channeling, and with desirable flavor and physical characteristics; the resulting puck may be consistent, from one puck to the next. A user may use the disclosed coffee grounds compactor to compact a first layer of first type of coffee grounds, may remove a tamper (if one was used), and may put a second layer of a second type of coffee grounds into the disclosed coffee grounds compactor to produce a two-layered puck, and may repeat the process, to form a multi-layered puck Referring now to the drawings, FIG. 1 is a parallel projection oblique view 100 of a first example of a ground coffee compactor 1101 and portafilter 1121. Portafilter 1121 is an example of a portafilter. In the illustrated embodiment, ground coffee compactor 1101 comprises portafilter receiver 1130, which may receive and secure portafilter 1121 in portafilter receiver 1130. Other varieties and sizes of portafilters may be used, with appropriate modifications to portafilter receiver 1130 and or a portafilter shim (discussed further herein).

In the illustrated embodiment, ground coffee compactor 1101 comprises activation switch 1610 and control dial 1615. Activation button 1610 and control dial 1615 are examples of components of a user interface, which may receive user input and may be coupled to or be part of control circuit 1316, discussed further herein, to control ground coffee compactor 1101. Control dial 1615 may be used to control one or more of an amplitude or power level, a frequency, drive angle, and or waveform of a vibration generator 1305, discussed further herein. In the embodiment illustrated in FIG. 1, control dial 1615 may control an amplitude of vibration generator 1305. Activation button 1610 may be used to turn vibration generator 1305 on and or off, such as at a power level, frequency, or the like controlled by control dial 1615. Alternative or in addition to activation button 1610, ground coffee compactor 1101 may comprise a pressure sensor or portafilter sensor in or coupled to portafilter receiver 1101 and control circuit 1216 to turn vibration generator 1305 on and or off in response to presence of a portafilter in portafilter receiver 1101, in response to pressure from portafilter 1121 in portafilter receiver 1101, and the like.

In the embodiment illustrated in FIG. 1, ground coffee compactor 1101 further comprises lid 1150. In this embodiment, lid 1150 may be attached to portafilter receiver 1130 by hinge 1160, discussed further herein. In addition to or in place of hinge 1160, lid 1150 may releasably be secured to portafilter receiver 1130 with a releasable fastener. In the embodiments illustrated herein, the releasable fastener comprises a set of one or more magnets in lid 1150 which may be attracted to a ferrite or magnet(s) in portafilter receiver 1130. Other means for a releasable fastener include a spring-loaded mechanism, a strap, a buckle, a threaded connection, and the like. In the embodiment illustrated in FIG. 1, lid 1150 comprises tamper opening 1155, Tamper opening 1155 may be sized to receive a tamper, such as tamper 1120 discussed herein, and to guide the tamper into portafilter 1121, so that coffee grounds in portafilter 1121 may be tamped by tamper 1120 as coffee ground compactor 1101 transmits vibratory force into portafilter receiver 1130 and portafilter 1121.

In the embodiment illustrated in FIG. 1, ground coffee compactor 1101 further comprises housing 1140. Housing 1140 may be secured to portafilter receiver 1101 and may house or contain electronics and other components discussed herein.

Housing 1140 and portafilter receiver 1130 may be made from wood, metal, composites, plastics, fibers, and the like.

Figure 2:
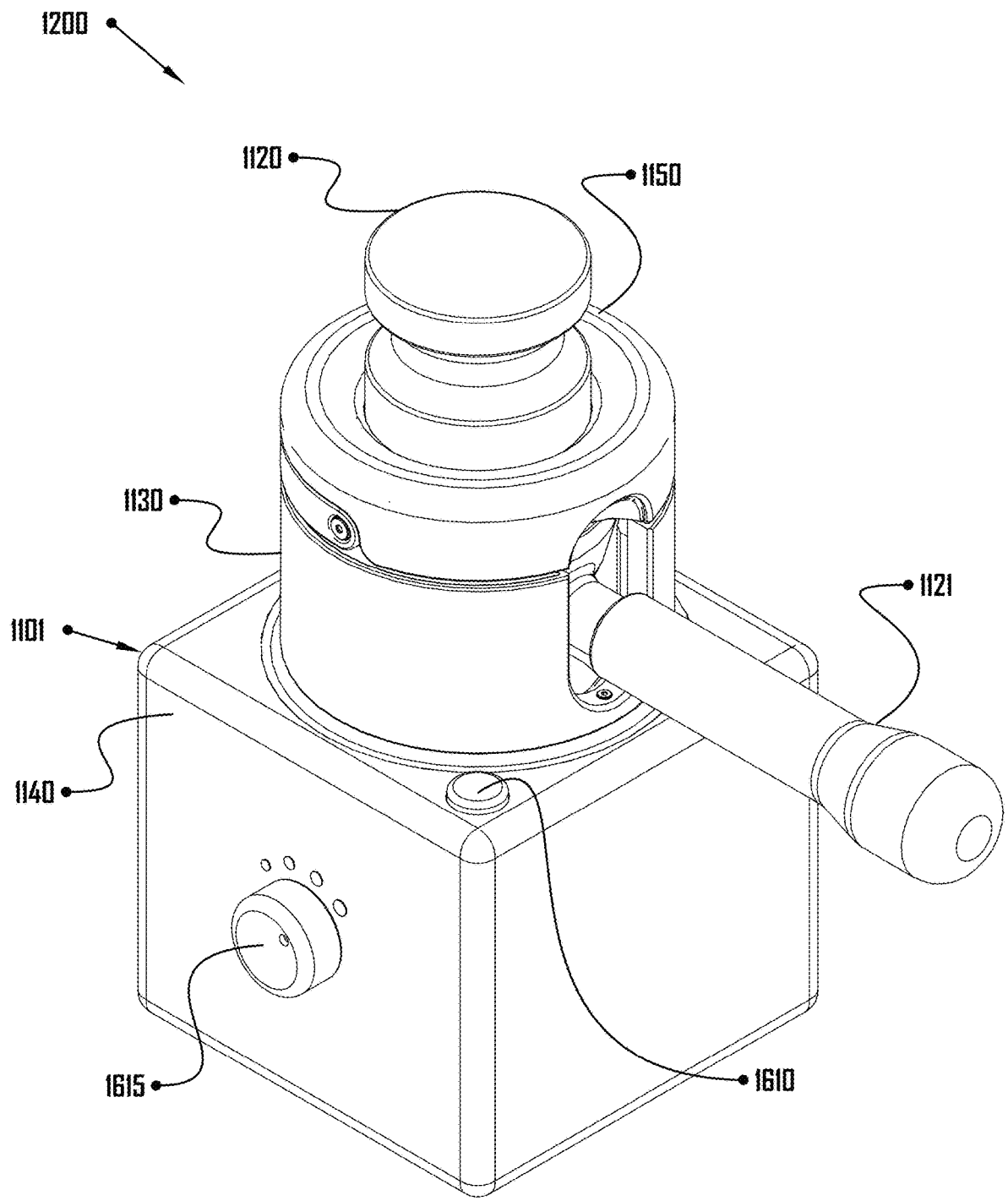
FIG. 2 is a parallel projection oblique view of an example of the ground coffee compactor and portafilter of FIG. 1 with a tamper, incorporated with teachings of the present disclosure, according to some embodiments.

FIG. 2 is a parallel projection oblique view 1200 of ground coffee compactor 1101 and portafilter of FIG. 1 with tamper 1120 in portafilter receiver 1130. In addition to other labeled elements discussed herein, FIG. 2 illustrates that, as discussed herein, a tamper, such as tamper 1120, may be inserted into tamper opening 1155, to tamp coffee grounds in portafilter 1121. Tamper 1120 may be inserted into tamper opening 1155 prior to or after activating vibration generator 1305, depending on a user's preferences.

Figure 3:
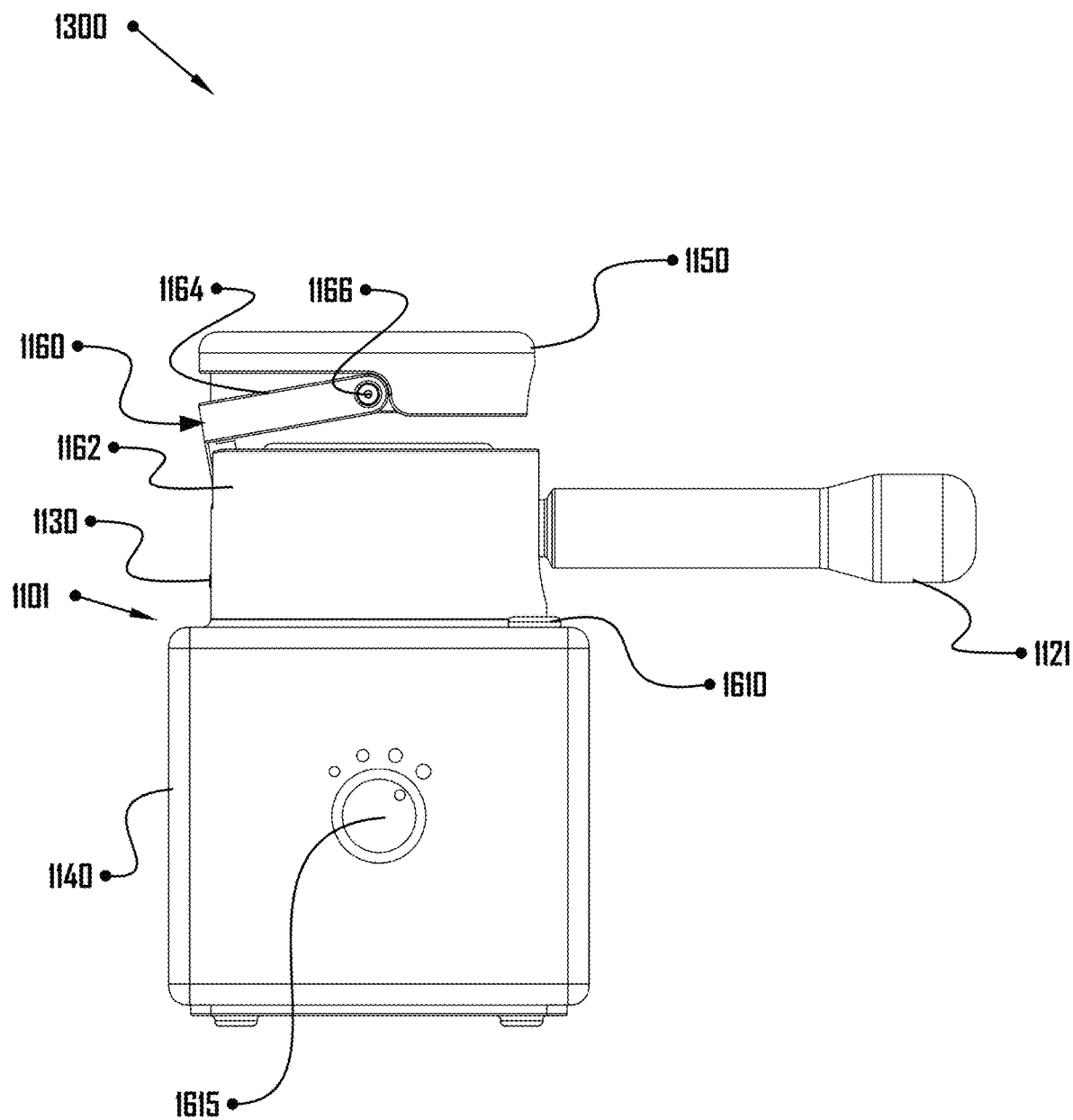
FIG. 3 is a parallel projection side elevation view of an example of the ground coffee compactor and portafilter of FIG. 1, illustrating the lid elevated and parallel to a top of the portafilter, incorporated with teachings of the present disclosure, according to some embodiments.

FIG. 3 is a parallel projection side elevation view 1300 of the example of the ground coffee compactor and portafilter of FIG. 1, illustrating lid 1150 elevated on hinge 1160 and parallel to a top of portafilter 1121. Hinge 1160 may be a double action hinge, comprising, for example, first pivot point 1162 (within portafilter receiver 1130, generally at a location identified at first pivot point 1162), second pivot point 1166, and pivot arm 1164. As lid 1150 and pivot arm 1164 pivot around first pivot point, second pivot point 1166 may allow lid 1150 to rotate to maintain or obtain an orientation parallel to the top of portafilter 1121 and or portafilter receiver 1130. This may allow lid 1150 to seat approximately on top of portafilter 1121 when, for example, portafilter 1121 extends above a top of portafilter receiver 1130.

Figure 4:
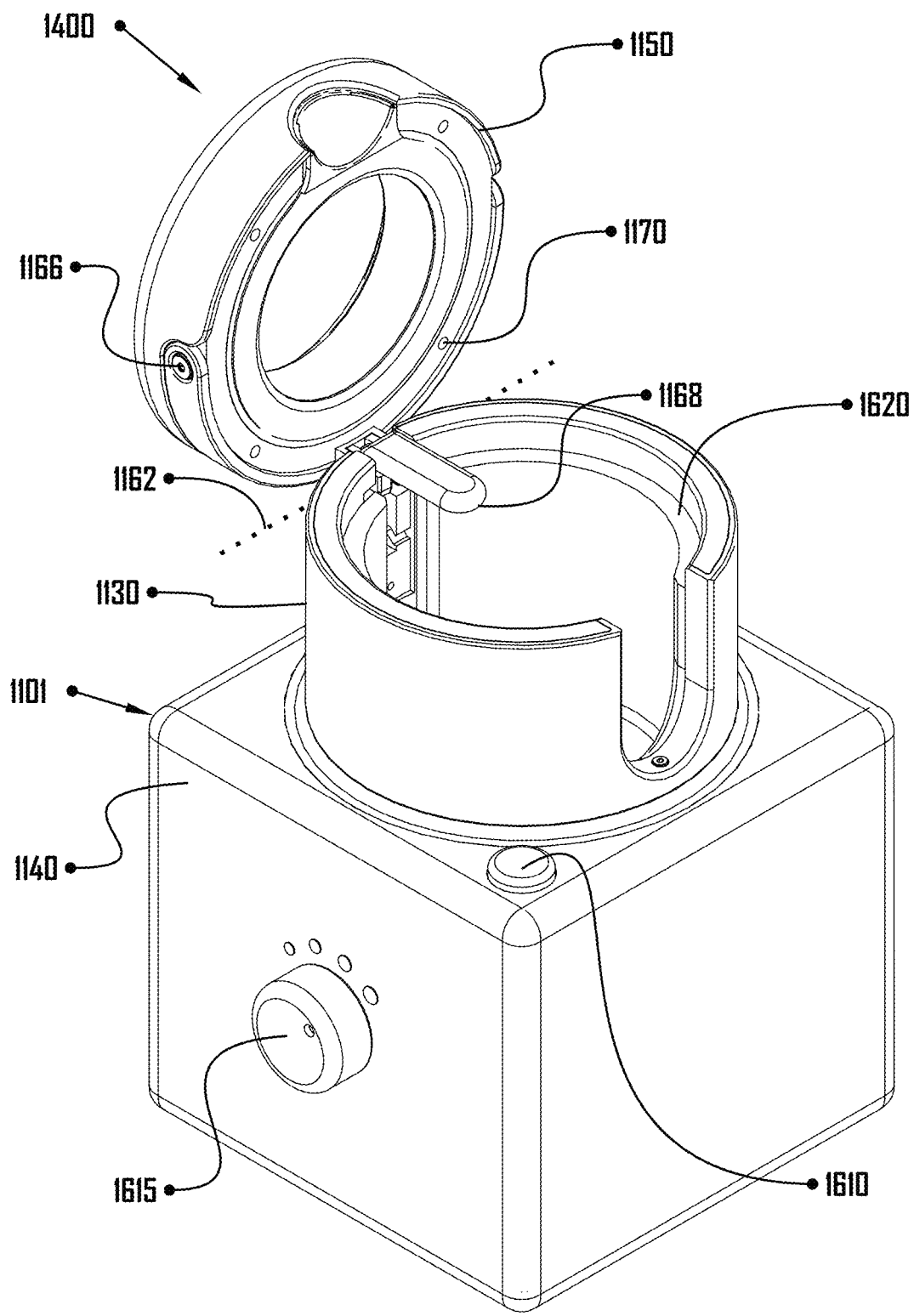
FIG. 4 is a parallel projection oblique view of an example of the ground coffee compactor of FIG. 1 with a lid in an open position, incorporated with teachings of the present disclosure, according to some embodiments.

FIG. 4 is a parallel projection oblique view 1400 of an example of ground coffee compactor 1101 of FIG. 1 with lid 1150 in an open position. In view 1400, in addition to other elements, e.g. a location of first pivot point 1162 indicated by dotted line, closing lever-arm 1168 is visible in the embodiment illustrated in view 1400. Closing lever-arm 1168 may engage with a portafilter, such as with portafilter 1121, to cause lid 1150 to close on the portafilter when the portafilter is inserted within portafilter receiver 1130. Removal of the portafilter from portafilter receiver 1130 may allow lid 1150 to raise. Hinge 1160 may be spring-loaded, such that hinge 1160 is biased to open or close when the portafilter is inserted in or removed from portafilter receiver 1130.

View 1400 further illustrates an example of a location of first pivot point 1162 within portafilter receiver 1130, indicated by dotted line. FIG. 4 further illustrates an example of portafilter shim 1620; portafilter shim 1620 may be one of a plurality of portafilter shims sized to secure at least one of a range of portafilter sizes and portafilter options within portafilter receiver 1130. For example, different portafilters may have different outside diameters, may have different hardware to engage with a group head of an espresso machine, e.g. portafilter locking tab 1630, may have spouts, or the like. Portafilter shim 1620 may allow a range of such portafilter sizes and portafilter options to engage with and be held or secured within portafilter receiver 1130.

View 1400 further illustrates an example of releasable fastener 1170; in the example illustrated in view 1400, releasable fastener 1170 may comprise magnets in lid 1150. Such magnets may be attracted to magnets or a ferrite in portafilter receiver 1130 and may serve as the releasable fastener, securing lid 1150 to portafilter receiver 1130, as discussed herein.

Figure 5:
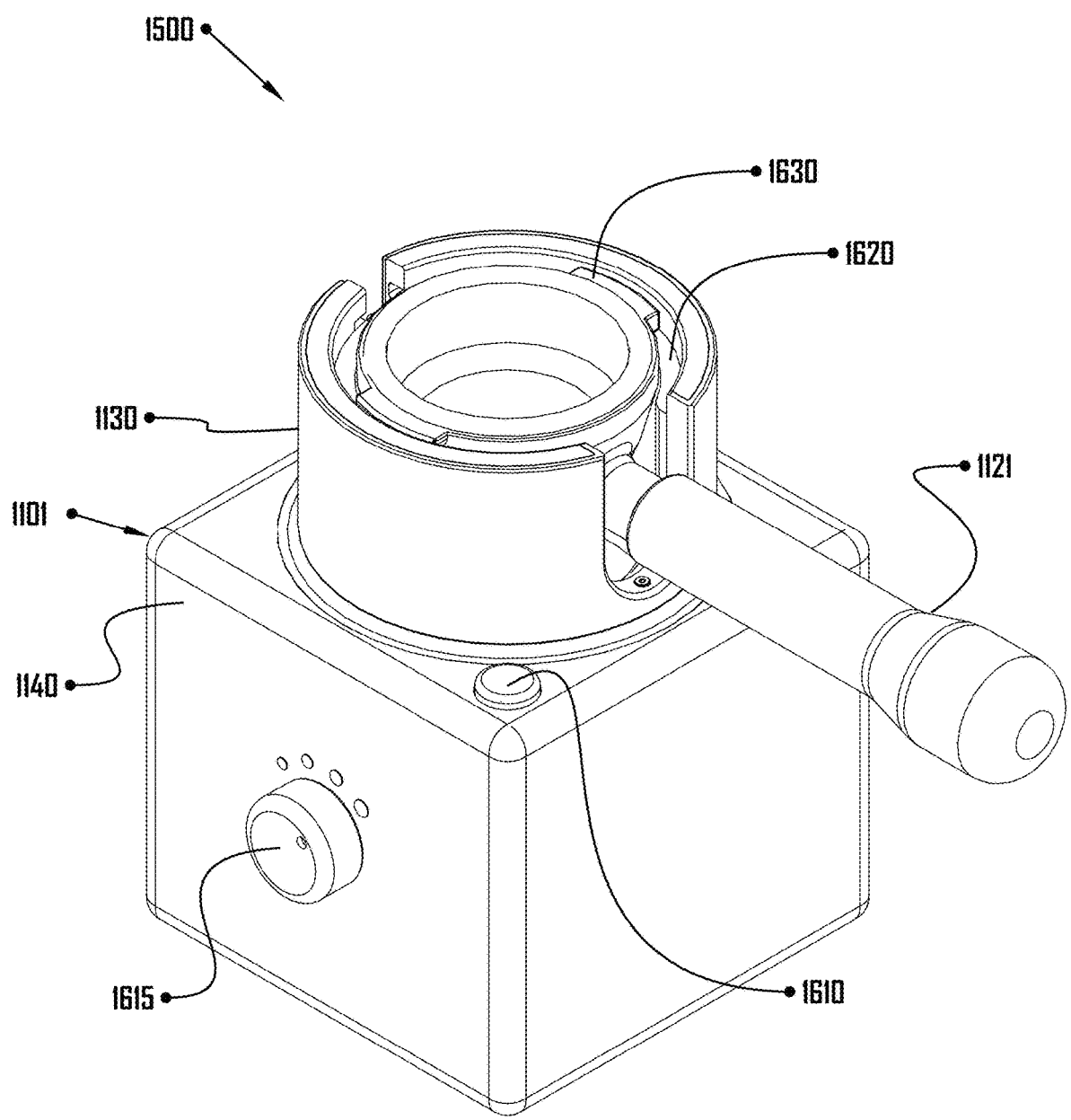
FIG. 5 is a parallel projection oblique view of an example of a ground coffee compactor with no lid and with a portafilter in a portafilter receiver, incorporated with teachings of the present disclosure, according to some embodiments.

FIG. 5 is a parallel projection oblique view 1500 of an example of ground coffee compactor 1101 with no lid and with portafilter 1121 in portafilter receiver 1130. View 1500 illustrates portafilter locking tab 1630, which may be used to engage with and secure portafilter 1121 in a group head of an espresso machine, resting on top of portafilter shim 1620.

Figure 6:
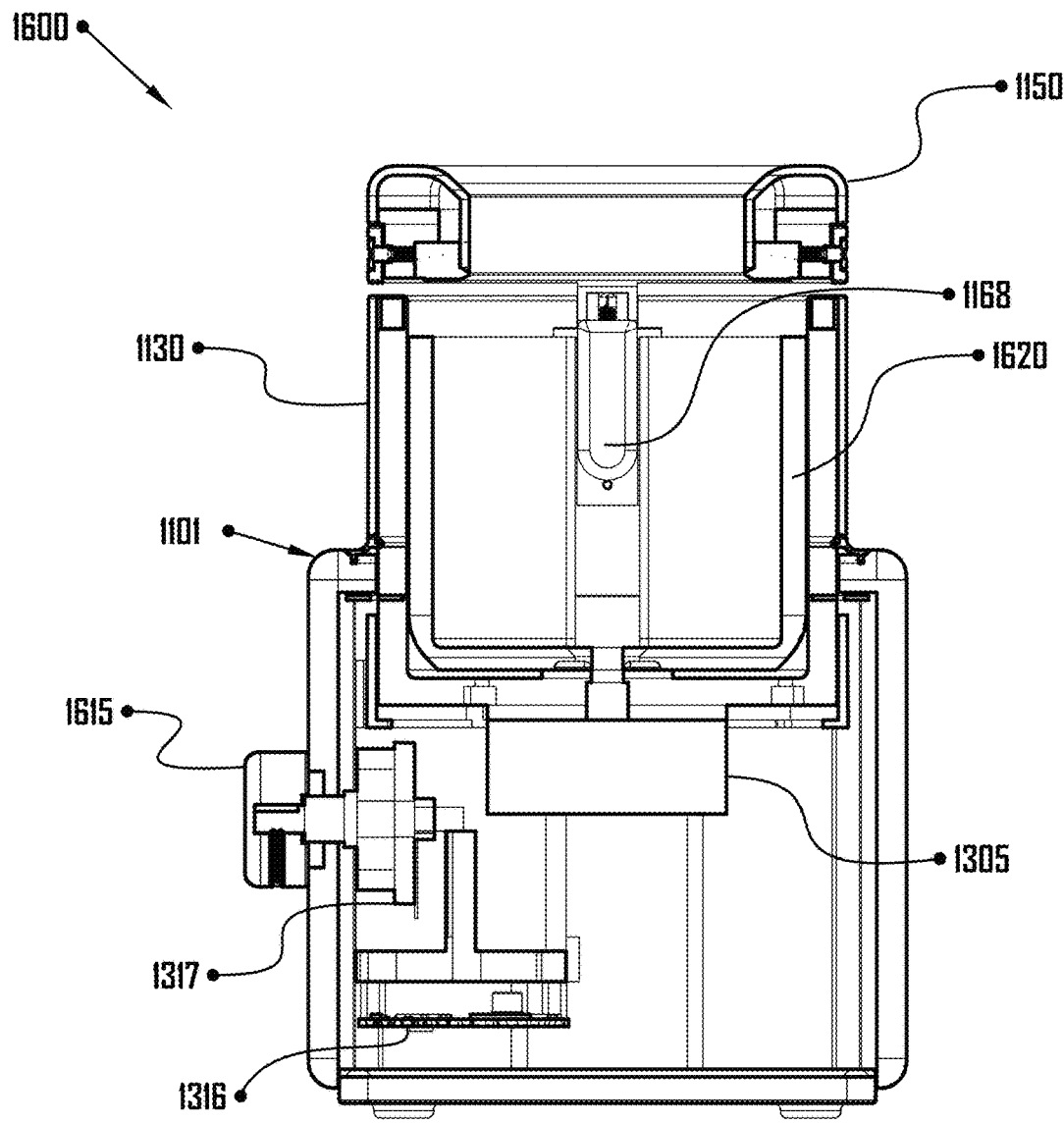
FIG. 6 is a parallel projection from view of the ground coffee compactor of FIG. 1 with a midline cross section, incorporated with teachings of the present disclosure, according to some embodiments.

FIG. 6 is a parallel projection front view 1600 of ground coffee compactor 1101 of FIG. 1 with a midline cross section to show interior components. View 1600 illustrates an example of vibration generator 1305.

A vibration generator in ground coffee compactor 1101, such as vibration generator 1305, is to generate a vibratory force. The vibratory force may be transmitted into a portafilter, e.g. portafilter 1121, such as via or through portafilter receiver 1130. The vibratory force is to at least one of distribute coffee grounds in the portafilter, to arrange coffee grounds in the portafilter, to compress coffee grounds in the portafilter, to sort coffee grounds by physical size in the portafilter, to sort coffee grounds by relative density in the portafilter, or to remove air from between coffee grounds in the portafilter. In the example illustrated in view 1600, vibration generator 1305 comprises a linear actuator. In the example illustrated in view 9100, a vibration generator may comprise a rotary motor, e.g. an electric rotary motor. The vibration generator, whether using a linear actuator or rotary motor, may comprise an inertial mass, wherein the inertial mass is provided to produce or tune the vibratory force.

When using a linear actuator as the vibration generator, the linear actuator may comprise at least one of a solenoid, a mechanical actuator, a hydraulic actuator, a pneumatic actuator, a piezoelectric actuator, an electro-mechanical actuator, a linear electric motor, and an electro-mechanical linear actuator. The linear actuator may produce the vibratory force along a drive angle, wherein the drive angle may be discussed relative to the portafilter receiver or portafilter.

In view 1600, vibration generator 1305 may comprise a piezoelectric actuator or a solenoid. In view 1600, the drive angle of vibration generator 1305 may be up-and down relative to view 1600. In embodiments, vibration generator 1305 may have a horizontal drive angle (e.g. "back-and-forth" or "side-to-side") or may be able to produce a vibratory force with a waveform.

Figure 8A:
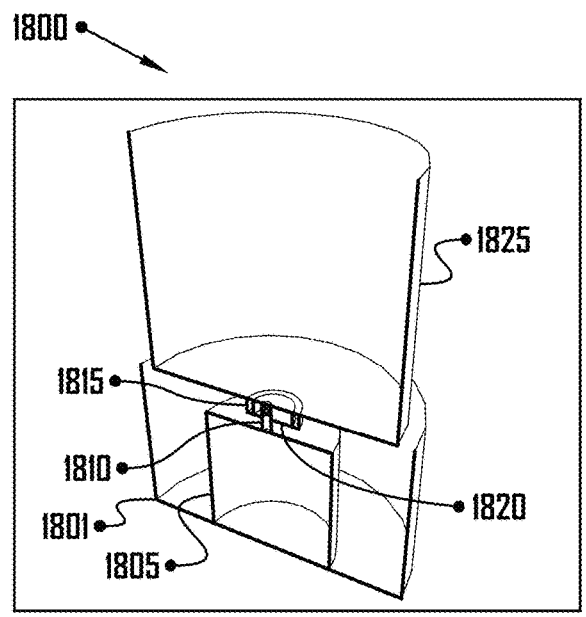
FIG. 8A is a parallel projection oblique view of a ground coffee compactor and a first example of a vibration generator with a midline cross section, incorporated with teachings of the present disclosure, according to some embodiments.
Figure 8B:
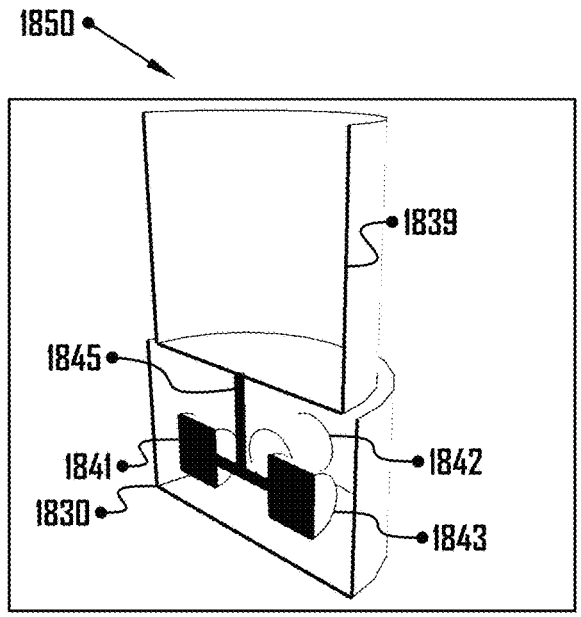
FIG. 8B is a parallel projection oblique view of a ground coffee compactor and a second example of a vibration generator with a midline cross section, incorporated with teachings of the present disclosure, according to some embodiments.
Figure 8C:
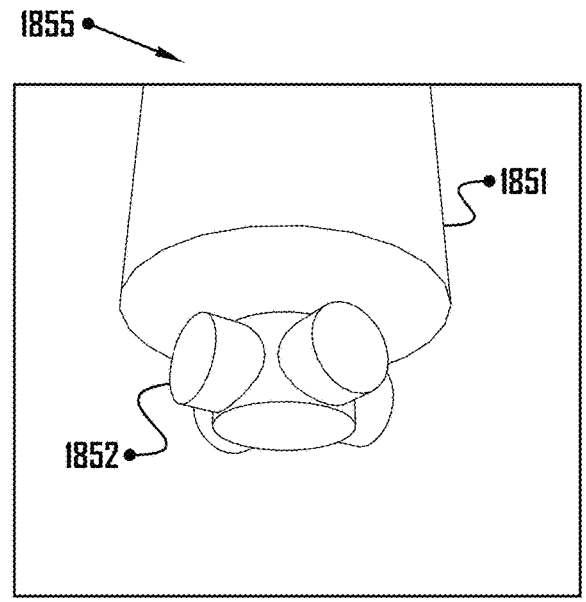
FIG. 8C is a parallel projection oblique view of a ground coffee compactor and a third example of a vibration generator, incorporated with teachings of the present disclosure, according to some embodiments.
Figure 8D:
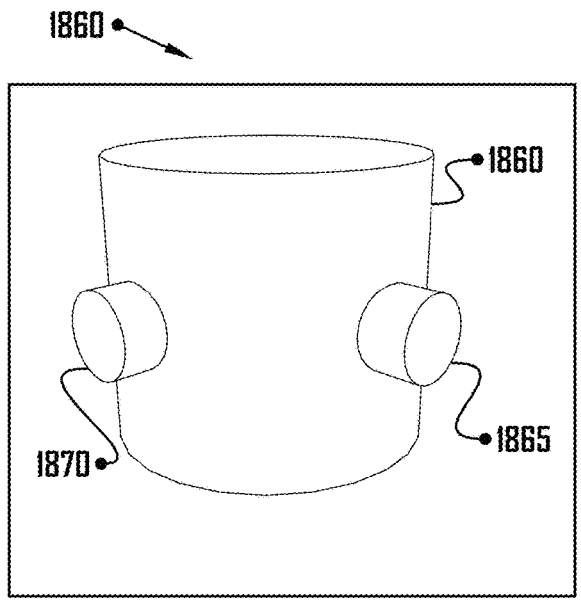
FIG. 8D is a parallel projection oblique view of a ground coffee compactor and a fourth example of a vibration generator, incorporated with teachings of the present disclosure, according to some embodiments.

As discussed herein, such as in relation to FIGS. 8B, 8C, and 8D, a plurality of linear actuators may be used together to produce the vibratory force, including a vibratory force with a waveform. When a plurality of linear actuators are used, at least one (typically each) of the plurality of linear actuators may produce the vibratory force at a drive angle relative to the portafilter receiver or relative to the other linear actuators that is offset relative to a drive angle of another of the plurality of linear actuators. A frequency of the respective linear actuators may then be engaged in a time phase (or "phase") relationship to produce a net vibratory force. The net vibratory force may comprise a plurality of components from each of the linear actuators, wherein the net vibratory force may be referred to as a waveform, wherein the waveform may comprise a standing wave and or a traveling wave, View 1600 further illustrates an example of control circuit 1316, which may be coupled to control dial 1615 and or activation button 1610, such as via potentiometer 1317. Control circuit 1316 may receive electrical power from, for example, a power cord, a battery, or the like. Control circuit 1316 may distribute the electrical power to, for example, the vibration generator. By controlling the vibration generator, control circuit 1316 may control an amplitude of vibratory force, a frequency of the vibratory force, or a waveform of the vibratory force produced by the vibration generator. Control circuit 1316 may further be coupled to sensors or switches (which may be referred to herein as "sensors"), wherein the sensors may provide feedback to control circuit 1316, wherein the feedback may be used to control the vibratory force or other aspects of ground coffee compactor 1101. Examples of sensors comprise pressure sensors, e.g. to detect pressure of a portafilter on or in a portafilter receiver, position sensors, e.g. to detect a lid position, encoders on or associated with the vibration generator to detect position, frequency, phase, operation and the like.

FIGS. 7A through 7D are meant to be viewed together.

Figure 7A:
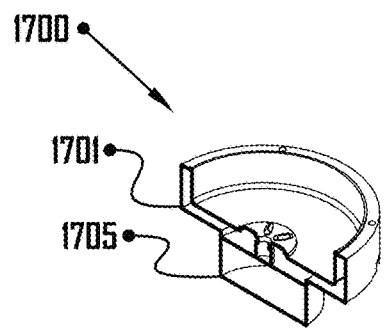
FIG. 7A is a parallel projection oblique view of a portafilter receiver base and a vibration generator, incorporated with teachings of the present disclosure, according to some embodiments.
Figure 7B:
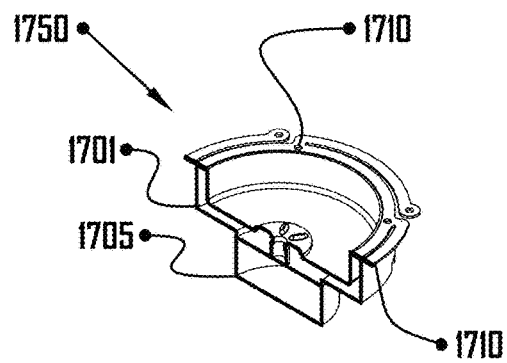
FIG. 7B is a parallel projection oblique view of the portafilter receiver base and a vibration generator of FIG. 7A with a spring, incorporated with teachings of the present disclosure, according to some embodiments.
Figure 7C:
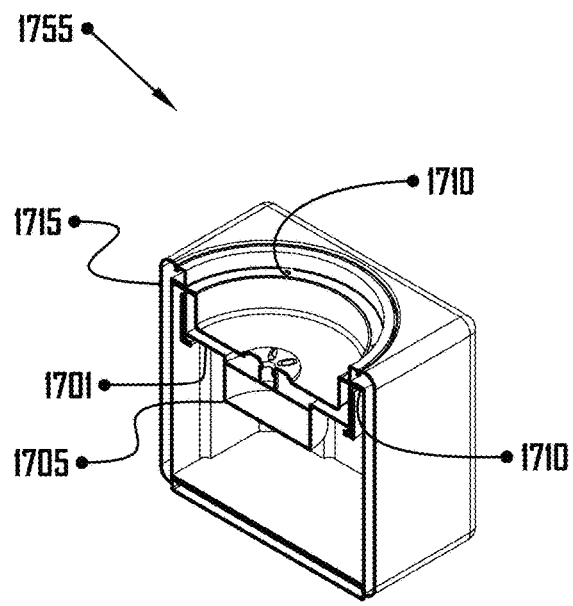
FIG. 7C is a parallel projection oblique view of the portafilter receiver base, vibration generator, and spring of FIG. 7B mounted in a housing, incorporated with teachings of the present disclosure, according to some embodiments.
Figure 7D:
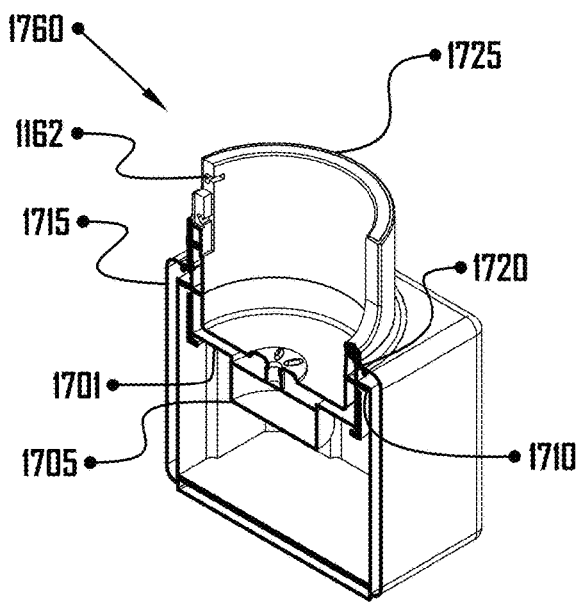
FIG. 7D is a parallel projection oblique view of the portafilter receiver base, vibration generator, spring, and housing of FIG. 7C with portafilter receiver upper components, incorporated with teachings of the present disclosure, according to some embodiments.

FIG. 7A is a parallel projection oblique view 1700 of portafilter receiver base 1701 and vibration generator 1705 with a midline cross section. FIG. 7B is a parallel projection oblique view 1750 of portafilter receiver base 1701 and vibration generator 1705 of FIG. 7A with spring 1710 (labeled in two locations) and with a midline cross section. FIG. 7C is a parallel projection oblique view 1755 of portafilter receiver base 1701, vibration generator 1705, and spring 1710 of FIG. 7B mounted in housing 1715. FIG. 7D is a parallel projection oblique view 1760 of portafilter receiver base 1701, vibration generator 1705, spring 1710, and housing 1715 of FIG. 7C with portafilter receiver upper 1725 and flexible boot 1720.

Together FIGS. 7A-7D illustrate that components of a portafilter receiver, e.g. portafilter receiver base 1701 and portafilter receiver upper 1725 may "float" separately from a housing, e.g. on a spring, also described herein as "isolation", wherein isolation refers to an isolation of two or more components, wherein the isolation allows at least one of the isolated components to vibrate, without or with reduced transmission of vibration into another of the isolated components. In the embodiment illustrated in FIGS. 7A-7D, the floating or isolated components further comprise vibration generator 1705, though, as discussed herein, a vibration generator may be secured to the housing, without isolation. Isolation of components may, for example, reduce a tendency of the housing to move or "walk" on a surface to the vibratory force experienced by the portafilter receiver.

In the example illustrated in FIGS. 7A-7D, spring 1710 provides isolation primarily in the "up-and-down" direction, e.g. when vibration generator 1705 has a drive angle on the y-direction; in embodiments a different spring may be used to provide isolation with respect to other drive angle directions.

View 1760 further illustrates flexible boot 1720, which may be provided to cover a gap between components of the portafilter receiver and the housing, and reduce a likelihood of coffee grounds or other debris from entering the housing.

FIG. 8A is a parallel projection oblique view 1800 with a midline cross section of a ground coffee compactor and a first example of a vibration generator. In the example illustrated in view 1800, the vibration generator comprises motor 1805, which may be a rotary electric motor. Motor 1805 may be secured to driveshaft 1810; driveshaft 1810 may be secured within eccentric driveshaft bearing 1820; eccentric driveshaft bearing 1820 may be secured to rotary bearing 1815. When motor 1805 causes driveshaft 1810 to rotate, eccentric driveshaft bearing 1820 rotates within rotary bearing 1815, and causes portafilter receiver 1825 to oscillate due to an eccentricity in eccentric driveshaft bearing. A spring, not illustrated, and or an eccentric mass, may further be incorporated into the vibration generator; a stay, not illustrated, may be included, to reduce a tendency of portafilter receiver 1825 to rotate, due to friction in rotary bearing 1815.

FIG. 8B is a parallel projection oblique view 1850 with a midline cross section of a ground coffee compactor and a second example of a vibration generator. In the example illustrated in view 1850, the vibration generator comprises an array of linear actuators, e.g linear actuator 1841, linear actuator 1842, linear actuator 1843, and, for example, a fourth linear actuator (no shown due to the midline cross section). Each linear actuator may comprise or be secured to a mass. The array of linear actuators may be secured to portafilter receiver 1839, such as via shaft 1845. The linear actuators may have a drive angle that is offset relative to other of the linear actuators. The array of linear actuators may be activated by a control circuit, e.g. by control circuit 1316, in a phase relationship.

FIG. 8C is a parallel projection oblique view 1855 with a midline cross section of a ground coffee compactor and a third example of a vibration generator. In the example illustrated in view 1855, vibration generator may comprise an array of linear actuator, e.g. linear actuator or cylinder 1852, or may comprise a rotary motor coupled to inertial masses in a plurality of cylinders, e.g. linear actuator or cylinder 1852. Activation of the array of linear actuators in a phase relationship or activation of the rotary motor may result in a vibratory force that is transmitted into portafilter receiver 1851, wherein the vibratory force may comprise a waveform.

FIG. 8D is a parallel projection oblique view 1855 of a ground coffee compactor and a fourth example of a vibration generator. In the example illustrated in view 1855, an array of linear actuators, e.g. linear actuator 1865 and linear actuator 1870 (additional linear actuators may be on a far side of portafilter receiver 1860 and or on a bottom of portafilter receiver 1860), may be secured to a housing (not illustrated). The array of linear actuators may be activated in phase, to oscillate portafilter receiver 1860 and produce a vibratory force therein.

In the examples illustrated in FIG. 8A-80, the vibratory force produced by the rotary motor (e.g. motor 1805) or by the array of linear actuators may produce the vibratory force with a waveform. The waveform may be adjustable.

Figure 9:
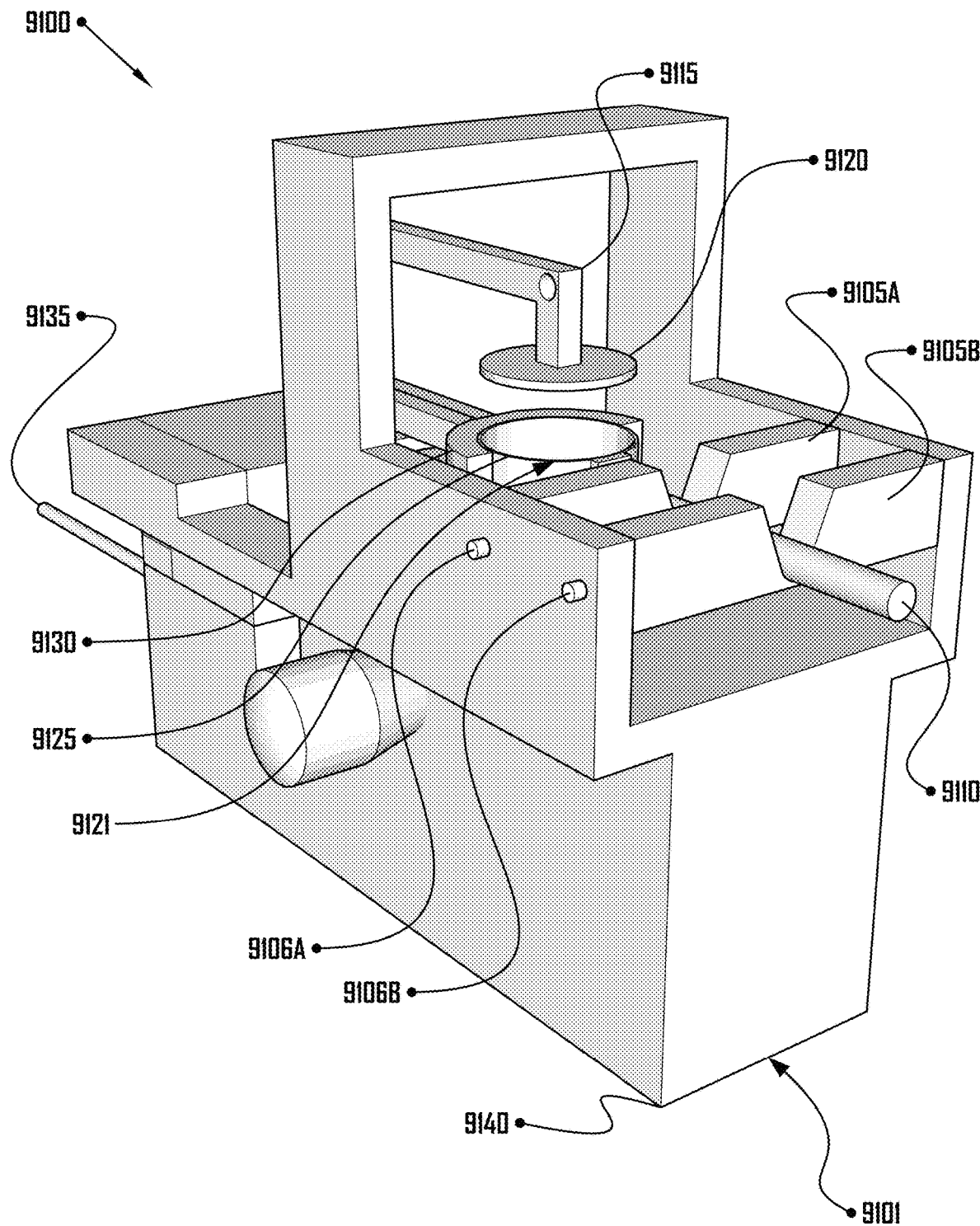
FIG. 9 is a first perspective oblique view of a second example of a ground coffee compactor, tamper, and portafilter incorporated with teachings of the present disclosure, according to some embodiments.

FIG. 9 is a perspective oblique view 9100 of a second example of ground coffee compactor 9101, tamper 9120, and portafilter 9121.

FIG. 9 illustrates an example of body 9140 of ground coffee compactor 9101. Body 9140 may hold other components of ground coffee compactor 9101 and or may hold portafilter 9121, as discussed herein.

FIG. 9 illustrates examples of portafilter handle 9110 and portafilter vessel 9125 of portafilter 9121. Portafilter handle 9110 may be used to hold portafilter 9121. Portafilter vessel 9125 may receive or hold coffee grounds. Portafilter handle 9110 and portafilter vessel 9125 may have a different geometric relationship, such as with portafilter handle pointing up, down, to the side, or the like and or portafilter handle 9110 may having a different cross section, such as oblong, square, round, continuous, discontinuous, or the like, Portafilter 9121, such as via portafilter vessel 9125 and or structures thereon (no illustrated), may be secured to a group head of an espresso machine or the like.

FIG. 9 illustrates examples of portafilter arm cradle 9105A and portafilter arm cradle 9105B. Portafilter arm cradle 9105 may be used to hold portafilter 9121 in an arrangement with ground coffee compactor 9101, as discussed herein.

FIG. 9 illustrates examples of portafilter arm cradle adjustment hardware 9106A and portafilter arm cradle adjustment hardware 9106B. Portafilter arm cradle adjustment hardware 9106 may be used to change an orientation of portafilter arm cradle 9105A and portafilter arm cradle 9105B within or relative to body 9140, such as to adjust an arrangement of portafilter 9121 with ground coffee compactor 9101, such as to accommodate portafilters with portafilter handles and portafilter vessels which have geometric relationships other than as illustrated in these examples.

FIG. 9 illustrates an example of portafilter vessel receiver 9130. Portafilter vessel receiver 9130 may receive portafilter 9121 and hold portafilter 9121 on or in an arrangement with ground coffee compactor 9101. Portafilter vessel receiver 9130 may comprise a vibratory activation switch, as discussed herein. Pressure on portafilter vessel receiver 9130 from portafilter 9121 may raise and lower tamper 9120. In embodiments, portafilter vessel receiver 9130 and or ground coffee compactor 9101 may comprise a funnel or similar structure, to funnel or facilitate movement of ground coffee into portafilter 9121.

FIG. 9 illustrates an example of power supply 9135. Power supply 9135 may be electrical power, such as alternating current or direct current from a power utility, battery, or the like, or may be a fuel supply, or the like. Power or energy from power supply 9135 may be used by a motor, by logical components, or by other components discussed herein.

FIG. 9 illustrates an example of tamper 9120.

FIG. 9 illustrates an example of tamper arm 9115. Tamper arm 9115 may hold tamper 9120 in an arrangement with portafilter 9121. Due to tamper arm 9115, the arrangement between tamper and portafilter 9121 may be variable, such as above portafilter 9121, such as within a top margin of portafilter 9121, such as within portafilter 9121. Tamper arm 9115 may allow tamper 9120 to raise and lower with respect to its arrangement with portafilter 9121. Tamper arm 9115 may be manually actuated, such as by a barista pushing down on tamper arm 9115, and or may be actuated by pressure of portafilter 9121 on portafilter vessel receiver 9130, Tamper arm 9115 may be spring loaded, to return to a position, such as a position with tamper 9130 above portafilter 9121 or within portafilter 9121.

Figure 10:
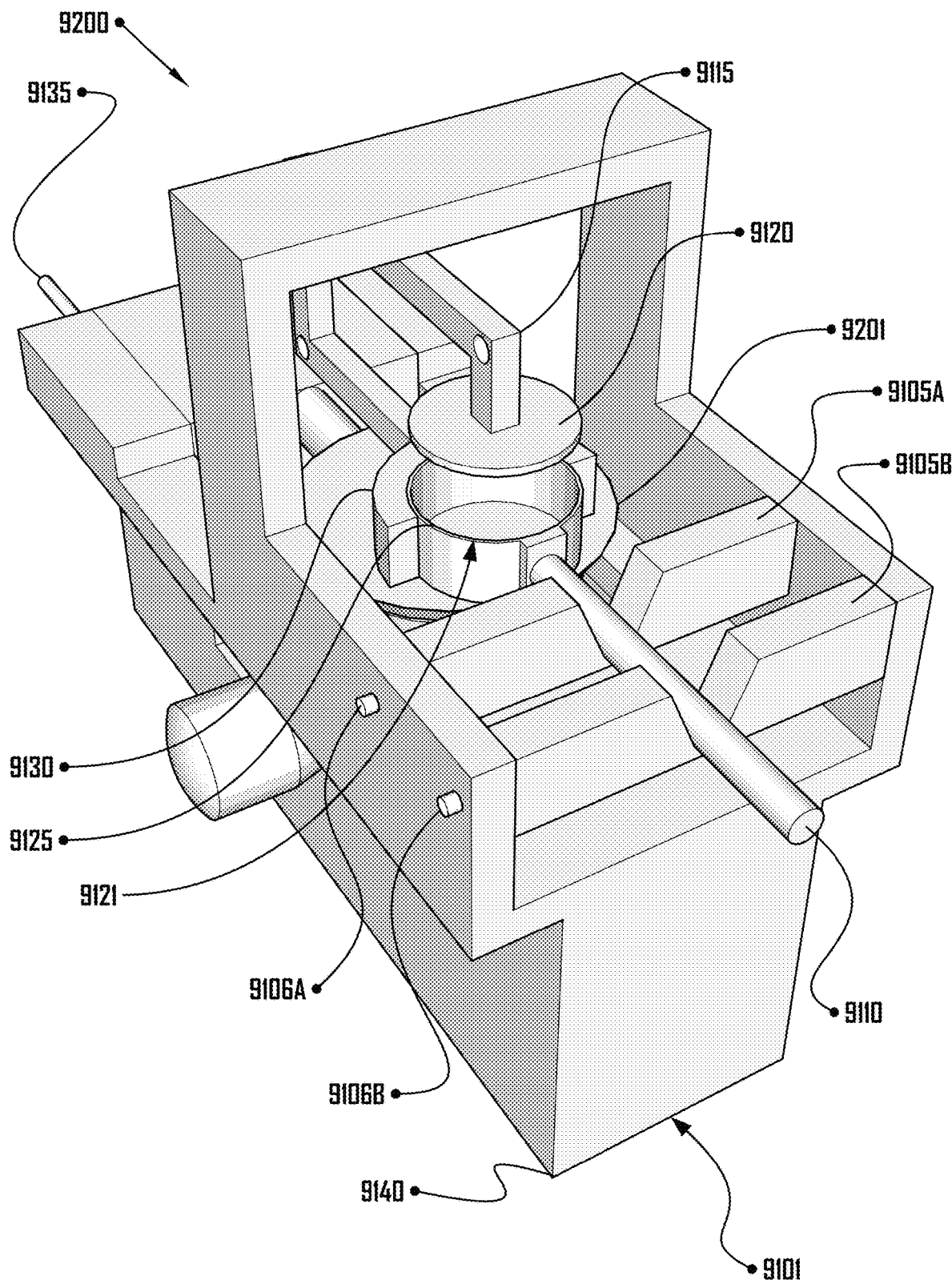
FIG. 10 is a second perspective oblique view of the example of the ground coffee compactor, tamper, and portafilter of FIG. 9, incorporated with teachings of the present disclosure, according to some embodiments.

FIG. 10 is a perspective oblique view 9200 of the example of ground coffee compactor 9101, tamper 9120, and portafilter 9121 of FIG. 9. Perspective oblique view 9200 provides a clearer view of vibratory surface 9201 and of portafilter 9121 in contact with vibratory surface 9201.

Figure 11:
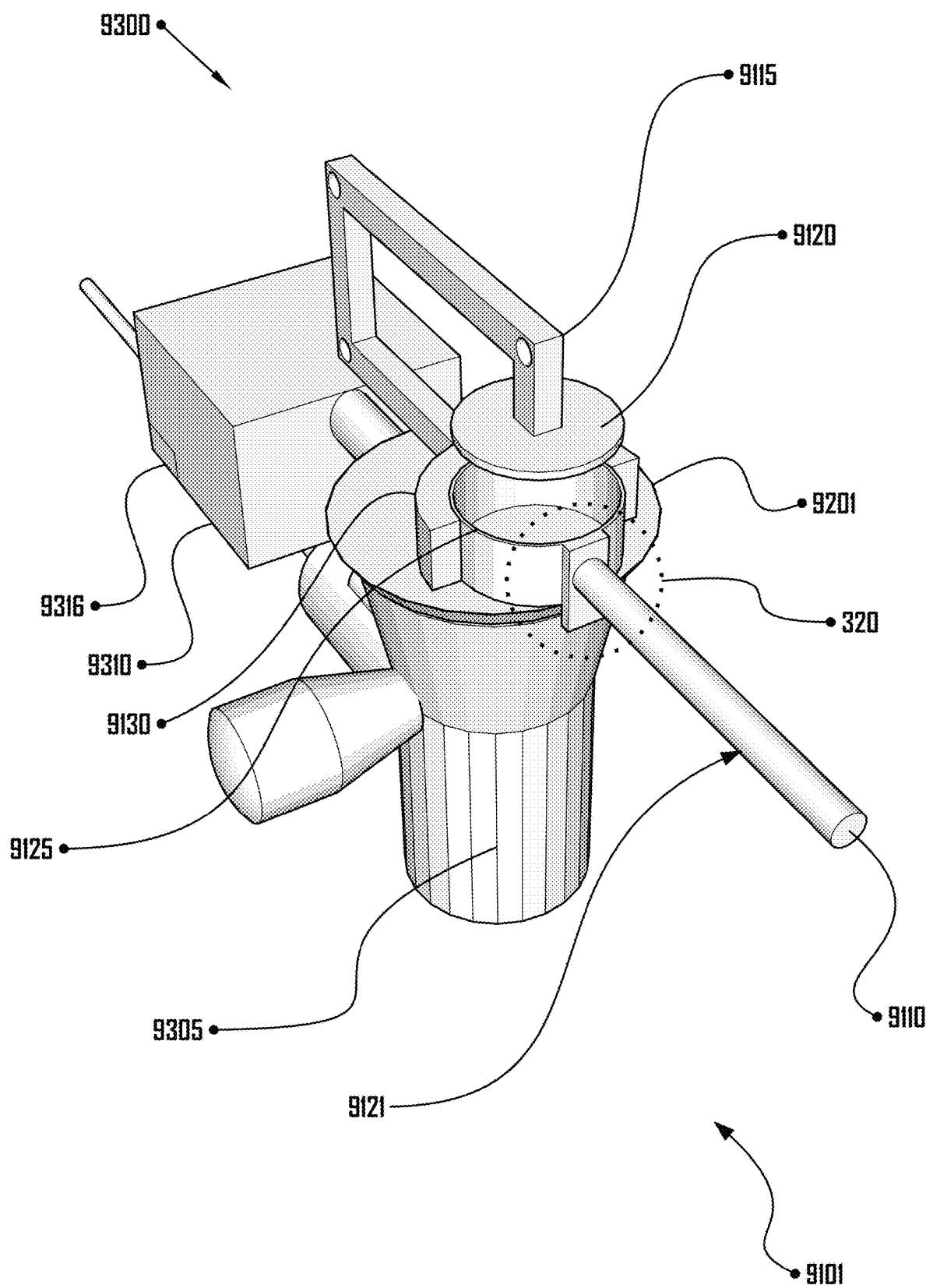
FIG. 11 is the second perspective oblique view of the example of the ground coffee compactor, tamper, and portafilter of FIG. 9, incorporated with teachings of the present disclosure, consistent with embodiments of the present disclosure, with a first portion of components hidden to allow greater focus on remaining components and with the tamper and portafilter in a first arrangement.

FIG. 11 is a perspective oblique view 9300 of the example of ground coffee compactor 9101, tamper 9120, and portafilter 9121 of FIG. 9, with a first portion of components hidden to allow greater focus on remaining components and with tamper 9120 and portafilter 9121 in a first arrangement. Visible in perspective oblique view 9300 of FIG. 11 is an interface or landing plate between portafilter handle 9110 and portafilter vessel 9125 contacting vibratory surface 9201, within dotted-line circle 9320. Contact of such interface or landing plate with vibratory surface 9201 may facilitate a user in arranging portafilter 9121 with ground coffee compactor 9101, including an arrangement which may produce distribution or compaction of coffee grounds within portafilter vessel 9125 which a user find desirable.

Motor 9305 may drive vibratory surface 9201 and or may drive a vacuum apparatus, such as a fan. Collection chamber 9310 may collect ground coffee, as may be collected or vacuumed up by vacuum apparatus. The vacuum apparatus may draw air in from around a perimeter of vibratory surface 9201 and force it into or through collection chamber 9310. Collection chamber 9310 may comprise an exit for air drawn into collection chamber 9310; such exit may comprise a filter, to prevent or impede exit of ground coffee from collection chamber 9310. Control circuit 9316 may comprise one or more electrical components, computer processor, computer memory, and modules thereof. Control circuit 9316 may be located in one or more areas of ground coffee compactor 9101. Motor 9305 may drive vibratory surface 9201 via direct drive or via one or more gear mechanisms ("drive train"). The drive train may produce oscillation and or vibration of vibratory surface 9201. Control circuit 9316 may be coupled to motor 9305, vibratory activation switch 9405, and or power supply 9135.

Figure 12:
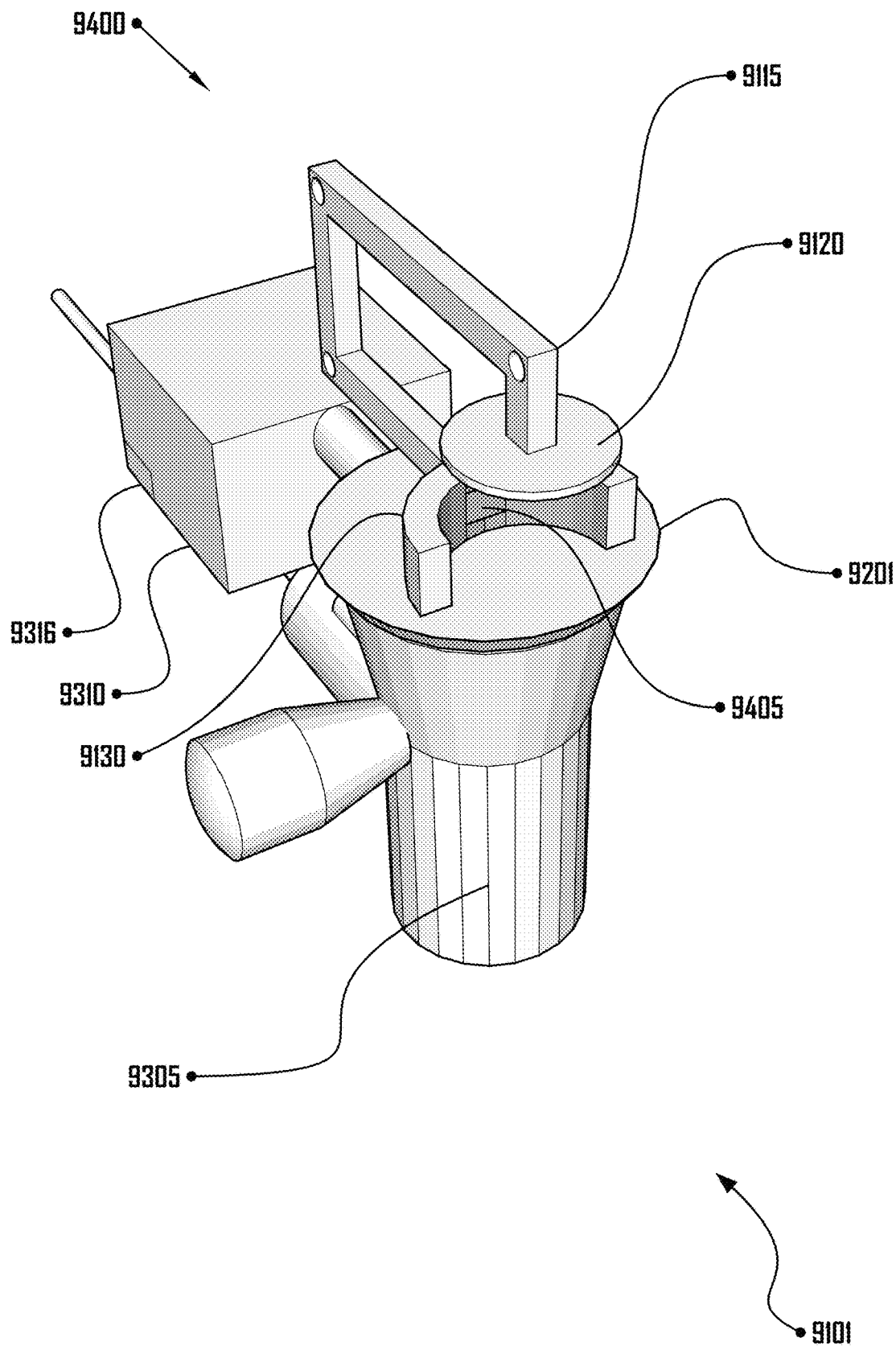
FIG. 12 is the second perspective oblique view of the example of the ground coffee compactor of FIG. 9, incorporated with teachings of the present disclosure, consistent with embodiments of the present disclosure, with a second portion of components hidden to allow greater focus on remaining components.

FIG. 12 is a perspective oblique view 9400 of the example of ground coffee compactor 9101 of FIG. 9, with a second portion of components hidden to allow greater focus on remaining components. Illustrated is vibratory activation switch 9405. Vibratory activation switch 9405 may be coupled to motor 9305 and power supply 9135, such as via control circuit 9316, and may cause activation of motor 9305 and vibration of vibratory surface 9201. Pressure on vibratory activation switch 9405 from, for example, portafilter 9121, may cause control circuit 9316 to activate motor 9305. Vibratory activation switch 9405 and or control circuit 9316 may be sensitive to variable pressure from portafilter 9121, to change a power level, type of vibration, waveform of vibratory force, or the like.

In the illustrated examples, portafilter 9121 does not comprise a spout, e,g. is a bottomless portafilter. In embodiments, portafilter 9121 may comprise one or more spouts. In embodiments, vibratory surface 9201 may comprise a notch, cut-out, stand-off, or the like, to accommodate spout(s) on a portafilter. In embodiments, vibratory surface 9201 may comprise a surface which is not flat.

Figure 13:
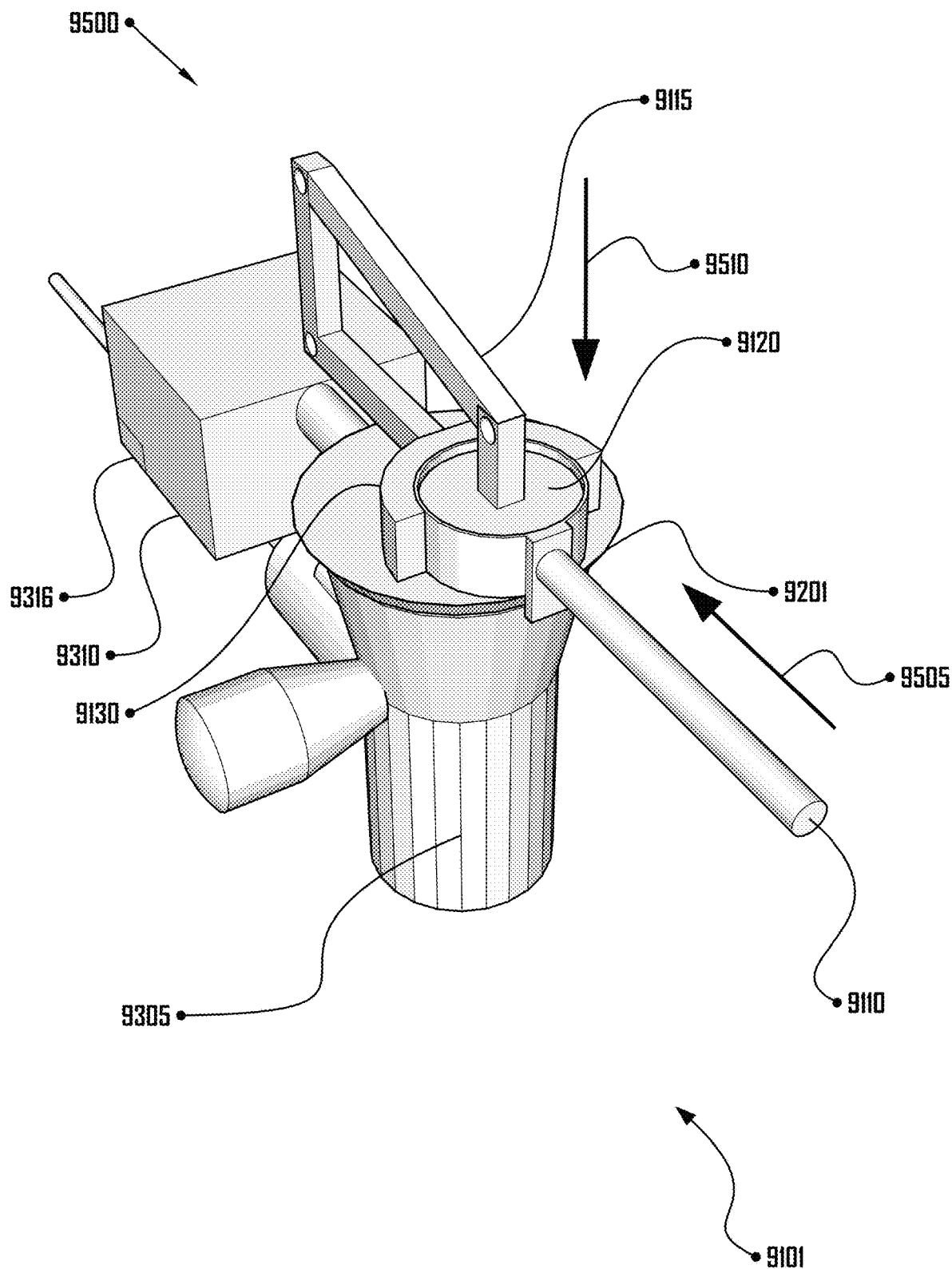
FIG. 13 is the second perspective oblique view of the example of the ground coffee compactor, tamper, and portafilter of FIG. 9, incorporated with teachings of the present disclosure, consistent with embodiments of the present disclosure, with the first portion of components hidden to allow greater focus on remaining components and with the tamper and portafilter in a second arrangement.

FIG. 13 is a perspective oblique view 9500 of the example of ground coffee compactor 9101, tamper 9120, and portafilter of FIG. 9, with the first portion of components hidden to allow greater focus on remaining components and with tamper 9120 and portafilter 9121 in a second arrangement. In the example illustrated in FIG. 13, portafilter 9121, such as via portafilter handle 9110, has been pushed into portafilter vessel receiver 9130, as indicated by arrow 9505. This pressure may activate control circuit 9316 and cause motor 9305 to vibrate vibratory surface 9201. This pressure may further cause tamper arm 9115 to lower, such as into portafilter vessel 9125, such as via tamper arm 9115, as indicated by arrow 9510.

Figure 14:
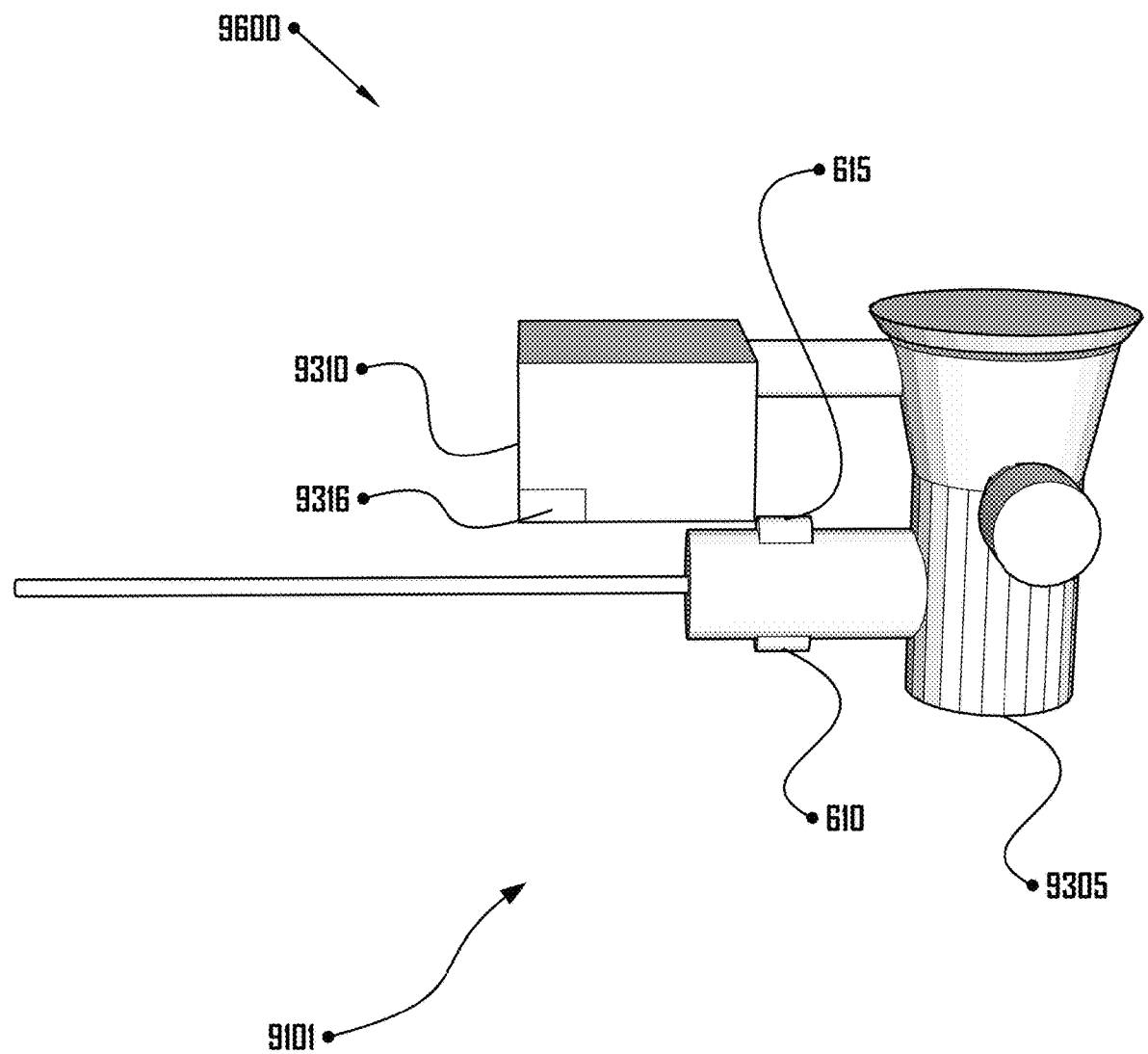
FIG. 14 is a third perspective oblique view of the example of the ground coffee compactor of FIG. 9, incorporated with teachings of the present disclosure, consistent with embodiments of the present disclosure, with a third portion of components hidden to allow greater focus on remaining components.

FIG. 14 is a perspective oblique view 9600 of the example of the ground coffee compactor 9101 of FIG. 9, with a third portion of components hidden to allow greater focus on remaining components. Activation switch 9610 and power dial 9615 may be coupled to or be part of control circuit 9316. Power dial 9615 may be used to control a power level of motor 9305. Activation switch 9610 may be used to turn motor 9305 on and or off.

Figure 15:
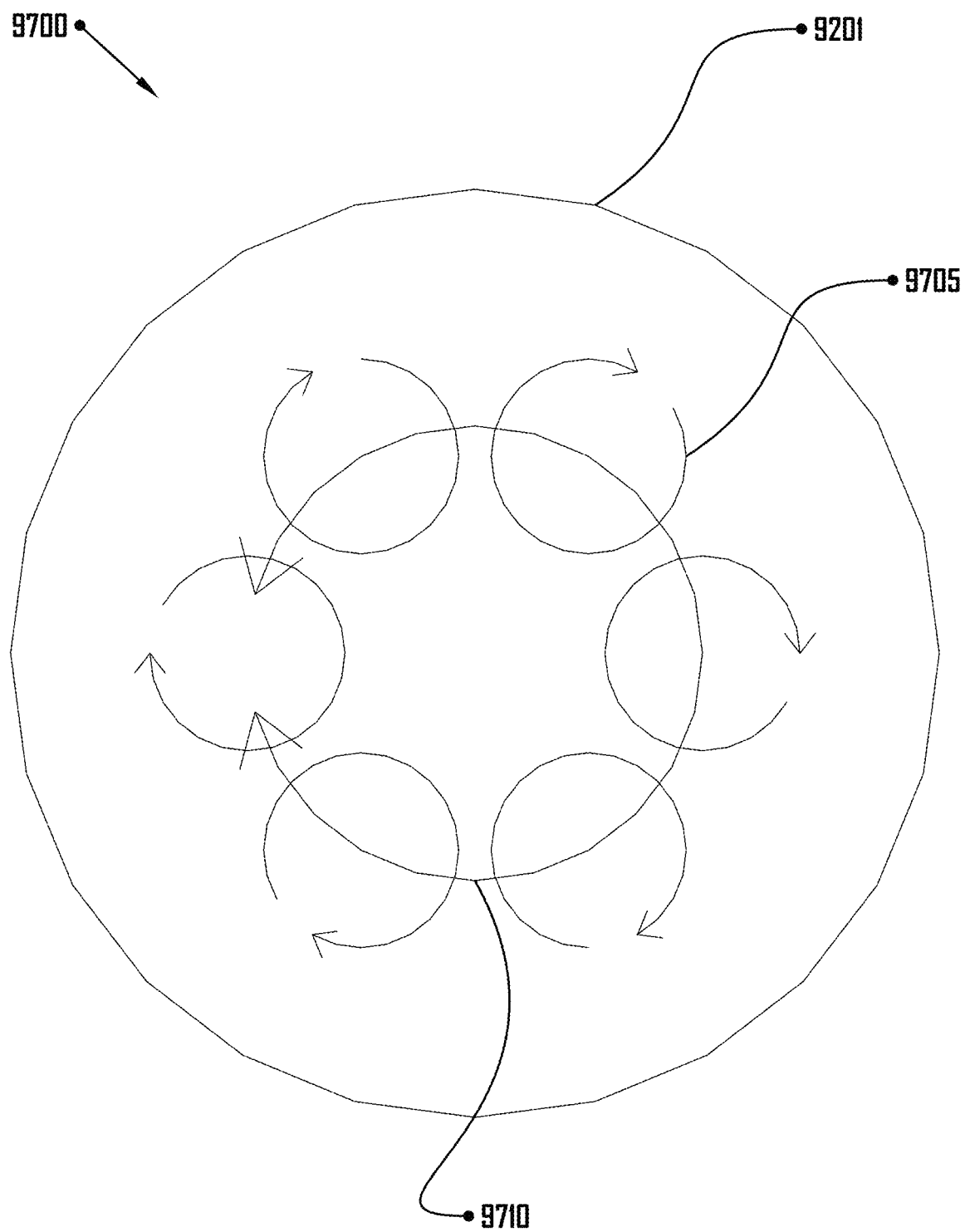
FIG. 15 is a top parallel projection view of an example of a vibratory surface of a ground coffee compactor, incorporated with teachings of the present disclosure, consistent with embodiments of the present disclosure.

FIG. 15 is a top parallel projection view 9700 of an example of vibratory surface 9201. of ground coffee compactor 9101. Driven by motor 9305 and a drive train thereof, vibratory surface 9201 may undergo one or more vibratory motions. One such motion may be rotations, such as rotation 9705. Rotation 9705 may be in either a clockwise or counterclockwise direction and or may change direction of rotation. Another such motion may be rotation 9710. Rotation 9710 may be either a clockwise or counterclockwise direction and or may change direction of rotation. Additional vibratory modes and motions may be used or achieved, such as up-and-down motion or vibration, back-and-forth motion or vibration, and the like.

Energy delivered by vibrations may peak shortly after power is turned on to motor 9305, and may fall to a level, wherein the level may be set, for example, by power dial 9615 and or control circuit 9316. Control circuit 9316 and or activation switch 9610 may cause motor 9305 to cycle on-and-off, to stay on, to follow different vibratory patterns, to respond to variable pressure of portafilter 9121 on vibratory activation switch 9405, and the like.

A computer within control circuit may include a chipset. Chipset may include processor, input/output (I/O) port(s) and peripheral devices, such as output and input, and network interface, and computer device memory, all interconnected via bus. Network interface may be utilized to form connections with network, with a datastore, or to form device-to-device connections with other computers.

Chipset may include communication components and/or paths, e.g., buses, that couple processor to peripheral devices, such as, for example, output and input, which may be connected via I/O ports. Processor may include one or more execution cores (CPUs). For example, chipset may also include a peripheral controller hub (PCH) (not shown). In another example, chipset may also include a sensors hub (not shown). Input and output may include, for example, user interface device(s) including a display, a touch-screen display, printer, keypad, keyboard, etc, sensor(s) including accelerometer, global positioning system (GPS), gyroscope, etc., communication logic, wired and/or wireless, storage device(s) including hard disk drives, solid-state drives, removable storage media, etc. I/O ports for input and output 240 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Computer device memory may generally comprise a random access memory ("RAM"), a read only memory ("ROM"), and a permanent mass storage device, such as a disk drive or SDRAM (synchronous dynamic random-access memory). Computer device memory may store program code for modules and/or software routines, such as, for example, one or more modules to implement vibratory modes.

Computer device memory may also store operating system. These software components may be loaded from a non-transient computer readable storage medium into computer device memory using a drive mechanism associated with a non-transient computer readable storage medium, such as a floppy disc, tape, DVD/CD-ROM drive, memory card, or other like storage medium. In some embodiments, software components may also or instead be loaded via a mechanism other than a drive mechanism and computer readable storage medium (e.g., via network interface).

Computer device memory is also illustrated as comprising kernel, kernel space, user space, user protected address space, and a datastore.

Computer device memory may store one or more process (i.e., executing software application(s)). Process may be stored in user space. Process may include one or more other process. One or more process may execute generally in parallel, i.e., as a plurality of processes and/or a plurality of threads.

Computer device memory is further illustrated as storing operating system and/or kernel. The operating system and/or kernel may be stored in kernel space. In some embodiments, operating system may include kernel. Operating system and/or kernel may attempt to protect kernel space and prevent access by certain of process.

Kernel may be configured to provide an interface between user processes and circuitry associated with the computer. In other words, kernel may be configured to manage access to processor, chipset, I/O ports and peripheral devices by process. Kernel may include one or more drivers configured to manage and/or communicate with elements of the computer (i.e., processor, chipset, I/O ports and peripheral devices).

The computer may also comprise or communicate via bus and/or network interface with a datastore. In various embodiments, bus may comprise a high speed serial bus, and network interface may be coupled to a storage area network ("SAN"), a high speed wired or wireless network, and/or via other suitable communication technology. The computer may, in some embodiments, include many more components than as illustrated. However, it is not necessary that all components be shown in order to disclose an illustrative embodiment.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

As used herein "releasable", "connect", "connected", "connectable", "disconnect", "disconnected," and "disconnectable" refers to two or more structures which may be connected or disconnected, generally without the use of tools (examples of tools including screwdrivers, pliers, drills, saws, welding machines, torches, irons, and other heat sources) or with the use of tools but in a repeatable manner (such as through the use of nuts and bolts or screws). As used herein, "attach," "attached," or "attachable" refers to two or more structures or components which are attached through the use of tools or chemical or physical bonding, but wherein the structures or components may not generally be released or re-attached in a repeatable manner. As used herein, "secure," "secured," or "securable" refers to two or more structures or components which are connected or attached.

The ground coffee compactor discussed herein may thereby be used to compact, e.g. to distribute and tamp coffee grounds in a portafilter, wherein a resulting puck of coffee grounds has an even level, a uniform and or continuous density distribution, results in no or reduced formation of channels, no or reduced squirting of espresso through the puck, and results in consistent and repeatable results. The ground coffee compactor may be used to form multiple layers in a puck, with each layer formed by distributing and tamping with ground coffee compactor, before a next layer is added, distributed, and tamped with the ground coffee compactor. In this way, the ground coffee compactor may produce more satisfactory espresso and may be used in the preparation of layered espresso.

Following are non-limiting examples:

Example 1. An apparatus to compact a coffee grounds in a portafilter, wherein the apparatus comprises a vibration generator and a portafilter receiver, wherein the portafilter receiver is to secure the portafilter to the vibration generator, wherein the portafilter is to contain the coffee grounds, the vibration generator is to produce a vibratory force in the portafilter receiver, portafilter receiver is to transmit the vibratory force into the portafilter, and the vibratory force is to compact the coffee grounds in the portafilter.

Example 2. The apparatus according to example 1 or another claim or example herein, wherein to compact the coffee grounds in the portafilter comprises at least one of to distribute the coffee grounds in the portafilter, to arrange the coffee grounds in the portafilter, to compress the coffee grounds in the portafilter, to sort the coffee grounds by physical size in the portafilter, to sort the coffee grounds by relative density in the portafilter, or to remove air from between the coffee grounds.

Example 3. The apparatus according to example 1 or another claim or example herein, further comprising a housing, wherein the portafilter receiver is secured to or in the housing.

Example 4. The apparatus according to example 3 or another claim or example herein, wherein the portafilter receiver is secured to or in the housing suspended on a spring.

Example 5. The apparatus according to example 4 or another claim or example herein, wherein the spring is to isolate the housing from the vibratory force.

Example 6. The apparatus according to example 4 or another claim or example herein, wherein the spring is to reduce a tendency of the housing to move on a surface due to the vibratory force.

Example 7. The apparatus according to example 3, wherein the vibration generator is to be secured to at least one of the housing or the portafilter receiver.

Example 8. The apparatus according to example 7 or another claim or example herein, wherein the vibration generator comprises at least one of a rotary motor or a linear actuator.

Example 9. The apparatus according to example 8 or another claim or example herein, wherein the linear actuator comprises at least one of a solenoid, a mechanical actuator, a hydraulic actuator, a pneumatic actuator, a piezoelectric actuator, an electro-mechanical actuator, a linear electric motor, and an electro-mechanical linear actuator.

Example 10. The apparatus according to example 8 or another claim or example herein, wherein the linear actuator is secured to the portafilter receiver.

Example 11. The apparatus according to example 10 or another claim or example herein, wherein the linear actuator comprises a plurality of linear actuators.

Example 12. The apparatus according to example 11 or another claim or example herein, wherein each of the plurality of linear actuators is to produce the vibratory force at a drive angle relative to the portafilter receiver ("drive angle").

Example 13. The apparatus according to example 12 or another claim or example herein, wherein the drive angle of at least one of the plurality of linear actuators is offset relative to a drive angle of another of the plurality of linear actuators.

Example 14. The apparatus according to example 13 or another claim or example herein, wherein a drive circuit is to control the drive angle of the plurality of linear actuators in a time phase relationship.

Example 15. The apparatus according to example 8 or another claim or example herein, wherein the linear actuator or the rotary motor is coupled to an inertial mass, wherein translation or rotation of the inertial mass by the linear actuator or by the rotary motor produces the vibratory force.

Example 16. The apparatus according to example 8, wherein the vibration generator comprises a driveshaft of the rotary motor coupled to at least one of an eccentric mass, an eccentric driveshaft bearing, or the portafilter receiver.

Example 17. The apparatus according to example 3, further comprising a flexible gasket between the housing and the portafilter receiver.

Example 18. The apparatus according to example 3, wherein the portafilter receiver comprises a lid, wherein the lid is to secure the portafilter within the portafilter receiver.

Example 19. The apparatus according to example 18, wherein a releasable fastener is to releasably secure the lid in a closed position on the portafilter receiver, wherein the closed position is to secure the portafilter within the portafilter receiver.

Example 20. The apparatus according to example 19, wherein the releasable fastener comprises at least one of a magnet or a spring.

Example 21. The apparatus according to example 18, wherein the lid is secured to portafilter receiver with a double action hinge.

Example 22. The apparatus according to example 21, wherein the double action hinge comprises a first pivot point on the housing, a pivot arm secured to the first pivot point, and a second pivot point on the pivot arm, wherein the first pivot point on the housing is to allow the pivot arm to rise above the portafilter receiver, wherein the lid is secured to the second pivot point on the pivot arm, and wherein the second pivot point is to allow the lid to maintain an orientation parallel to a top of the portafilter as the lid is to rise above the portafilter receiver on the pivot arm.

Example 23. The apparatus according to example 18, wherein the lid is secured to portafilter receiver with a hinge.

Example 24. The apparatus according to example 23, wherein the hinge is spring-loaded.

Example 25. The apparatus according to example 23, wherein the lid comprises a closing lever-arm, wherein the portafilter is to contact the closing-lever arm and is to cause the lid to close on the portafilter receiver.

Example 26. The apparatus according to example 18, wherein the lid comprises a tamper opening, wherein the tamper opening is to receive a tamper.

Example 27. The apparatus according to example 1, wherein the further comprising a tamper arm, wherein the tamper arm is to control engagement of a tamper with the portafilter.

Example 28. The apparatus according to example 1, wherein the portafilter comprises a range of portafilter sizes, wherein the portafilter receiver comprises a portafilter shim, wherein the portafilter shim is sized to secure at least one of the range of portafilter sizes within the portafilter receiver.

Example 29. The apparatus according to example 1, further comprising a tamper, wherein the tamper is to fit within the portafilter in the portafilter receiver and is to assist the vibratory force to compact the coffee grounds in the portafilter.

Example 30. The apparatus according to example 1, further comprising an electrical circuit, wherein the electrical circuit is to control the vibration generator to produce the vibratory force.

Example 31. The apparatus according to example 30, wherein the electrical circuit is control at least one of an amplitude of the vibratory force, a frequency of the vibratory force, or a waveform of the vibratory force.

Example 32. The apparatus according to example 30, wherein the electrical circuit comprises a user interface and wherein the user interface is to allow a user to control at least one of an amplitude of the vibratory force, a frequency of the vibratory force, or a drive angle over time of the vibratory force.

Example 33. The apparatus according to example 30 or another claim or example herein, wherein the electrical circuit is to control the vibration generator with feedback from at least one of a human input, a passage of time, a mass or pressure of the portafilter on the portafilter receiver or on a vibration activation switch, or a vibratory sensor.

The invention claimed is:

1. An apparatus to compact coffee grounds in a portafilter, wherein the apparatus comprises a vibration generator and a portafilter receiver, wherein the portafilter receiver is to secure the portafilter to the vibration generator, wherein the portafilter is to contain the coffee grounds, the vibration generator is to produce a vibratory force in the portafilter receiver, portafilter receiver is to transmit the vibratory force into the portafilter, and the vibratory force is to compact the coffee grounds in the portafilter, the apparatus further comprising a housing,
   wherein the portafilter receiver is secured to or in the housing,
   wherein the portafilter receiver comprises a lid, wherein the lid is to secure the portafilter within the portafilter receiver, and
   wherein the lid is secured to portafilter receiver with a double action hinge, wherein the double action hinge comprises a first pivot point on the housing, a pivot arm secured to the first pivot point, and a second pivot point on the pivot arm, wherein the first pivot point on the housing is to allow the pivot arm to rise above the portafilter receiver, wherein the lid is secured to the second pivot point on the pivot arm, and wherein the second pivot point is to allow the lid to maintain an orientation parallel to a top of the portafilter as the lid is to rise above the portafilter receiver on the pivot arm.

2. The apparatus according to claim 1, wherein the vibration generator is to be secured to at least one of the housing or the portafilter receiver.

3. The apparatus according to claim 2, wherein the vibration generator comprises at least one of a rotary motor or a linear actuator.

4. The apparatus according to claim 3, wherein the linear actuator is secured to the portafilter receiver.

5. The apparatus according to claim 3, wherein the linear actuator or the rotary motor is coupled to an inertial mass, wherein translation or rotation of the inertial mass by the linear actuator or by the rotary motor produces at least a portion of the vibratory force.

6. The apparatus according to claim 1, wherein the lid includes a releasable fastener is-to releasably secure the lid in a closed position on the portafilter receiver, wherein the closed position is to secure the portafilter within the portafilter receiver and the releasable fastener includes one or more magnets.

7. The apparatus according to claim 1, wherein the lid comprises a closing lever-arm, wherein the portafilter is to contact the closing-lever arm and is to cause the lid to close on the portafilter receiver.

8. The apparatus according to claim 1, wherein the portafilter receiver comprises a portafilter shim, wherein the portafilter shim is sized to secure at least one of a range of portafilter sizes within the portafilter receiver.

9. The apparatus according to claim 1, further comprising an electrical circuit, wherein the electrical circuit is to control the vibration generator to produce the vibratory force.

10. The apparatus according to claim 9, wherein the electrical circuit is to control at least one of an amplitude of the vibratory force, a frequency of the vibratory force, or a waveform of the vibratory force.

11. The apparatus according to claim 9, wherein the electrical circuit comprises a user interface and wherein the user interface is to allow a user to control at least one of an amplitude of the vibratory force, a frequency of the vibratory force, or a drive angle over time of the vibratory force.

* * * * *